United States Patent
Ying et al.

(10) Patent No.: US 8,163,851 B2
(45) Date of Patent: Apr. 24, 2012

(54) POLYMERIC SALTS AND POLY-NHC-METAL COMPLEXES

(75) Inventors: Jackie Y. Ying, Nanos (SG); Yugen Zhang, Nanos (SG); Dingyu Hu, Nanos (SG); Paranab K. Patra, Nanos (SG)

(73) Assignee: Institute of Bioengineering and Nanotechnology, Nanos (SG)

( * ) Notice: Subject to any disclaimer, the term of this patent is extended or adjusted under 35 U.S.C. 154(b) by 560 days.

(21) Appl. No.: 12/295,716

(22) PCT Filed: Jul. 5, 2006

(86) PCT No.: PCT/SG2006/000187
§ 371 (c)(1),
(2), (4) Date: Mar. 3, 2009

(87) PCT Pub. No.: WO2007/114793
PCT Pub. Date: Oct. 11, 2007

(65) Prior Publication Data
US 2009/0227740 A1    Sep. 10, 2009

(30) Foreign Application Priority Data
Apr. 5, 2006 (SG) ............ PCT/SG2006/000084

(51) Int. Cl.
*C08G 73/00* (2006.01)
(52) U.S. Cl. ............ 525/540; 528/423
(58) Field of Classification Search ............ 525/540
See application file for complete search history.

(56) References Cited

U.S. PATENT DOCUMENTS

| | | | |
|---|---|---|---|
| 5,066,811 A | 11/1991 | Connell et al. | |
| 5,116,934 A | 5/1992 | Connell et al. | |
| 5,120,825 A | 6/1992 | Vora et al. | |
| 6,251,846 B1 * | 6/2001 | Panandiker et al. | 510/332 |
| 6,316,380 B1 * | 11/2001 | Nolan et al. | 502/155 |
| 2003/0186803 A1 * | 10/2003 | Earle et al. | 502/167 |
| 2004/0197363 A1 * | 10/2004 | Winter et al. | 424/405 |
| 2010/0137608 A1 * | 6/2010 | Zhang | 548/103 |

FOREIGN PATENT DOCUMENTS

| | | | |
|---|---|---|---|
| JP | 59-138228 | | 8/1984 |
| JP | 03-277631 | | 12/1991 |
| JP | 2000248053 A | * | 9/2000 |
| JP | 200231917 A | * | 1/2002 |
| WO | 01/66248 | | 9/2001 |
| WO | 2004/014550 | | 2/2004 |

OTHER PUBLICATIONS

Machine translation of Fujimoto et al (JP 2002-31917).*
Suzuki et al.; "A new alkyl-imidazole polymer prepared as an inonic polymer electrolyte by in situ polymerization of dye sensitized solar cells"; *Journal of Photochemistry and Photobiology A: Chemistry*; 164:81-85 (2004).

* cited by examiner

*Primary Examiner* — Randy Gulakowski
*Assistant Examiner* — Mike M Dollinger
(74) *Attorney, Agent, or Firm* — Kilpatrick Townsend & Stockton LLP

(57) ABSTRACT

The invention provides a polymeric salt, wherein the monomer unit of the polymeric salt comprises two nitrogen containing heterocyclic groups joined by a rigid linker group. The nitrogen atoms of the heterocyclic groups are disposed so as to enable a polymeric carbene formed by from the polymeric salt to complex with a metal atom. The invention also provides a polymeric metal complex which may be made from the polymeric salt, and which may be used in a Suzuki coupling reaction. The polymeric salt may be used as a heterogeneous organic catalyst for cyanation reaction.

1

2

3

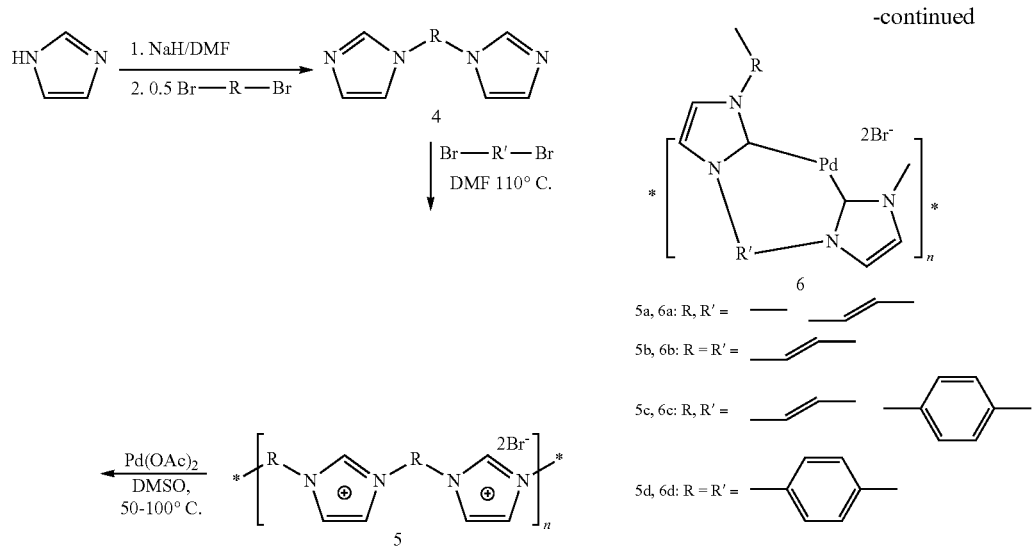
10 Claims, 6 Drawing Sheets

POLYMERIC SALTS AND POLY-NHC-METAL COMPLEXES

TECHNICAL FIELD

The present invention relates to synthesis and applications of polymeric salts and polymeric metal complexes.

BACKGROUND OF THE INVENTION

In recent years, N-heterocyclic carbenes (NHCs) have attracted considerable interest since the isolation of stable imidazol-2-ylidene by Arduengo in 1991 (Arduengo III, A. J.; Harlow, R. L.; Kline, M. K. *J. Am. Chem. Soc.* 1991, 113, 361; Arduengo III, A. *J. Acc. Chem. Res.* 1999, 32, 913.). The similarity of electron-rich organophosphanes $PR_3$ and NHCs, and NHCs' excellent σ-donating properties make them ligands of choice for transition metals. This has led to the preparation of organometallic catalysts which are useful in organic synthesis. It was found that a number of reactions, such as C—C coupling and olefin metatheses were more effectively catalyzed by NHC-metal complexes than by conventional catalysts. However, these homogeneous catalyst systems are difficult to separate and recycle, and pose a contamination issue for the products.

Compared to homogeneous catalysts, heterogeneous catalysts can be easily separated from the products and reused, and are attractive for green chemistry. Recently, several types of supported NHC-transition metal complexes have been designed so as to combine the advantages of both homogeneous and heterogeneous catalysts. NHC-metal complexes supported on mesoporous materials and particles/polymer hybrid materials have also been developed for various reactions. However, the existing polymer-supported or mesoporous materials-supported catalysts are limited by low activity, multi-step synthesis and low catalyst loading. The polymer-supported catalysts suffer from polymer swelling and the mesoporous silica-supported catalysts are sensitive to basic or acidic reaction conditions.

Micro- and nanometer-sized spherical particles have long been recognized for their many applications, including catalysis, optics, biosensing, drug delivery and data storage. Different methods have been developed for preparation of three major classes of materials particles: organic polymer particles, inorganic materials particles and very recently coordination polymer particles. Inorganic particle materials have had great impact on catalysis applications, but organic particles or coordination polymer particles directly used as catalysts in catalysis applications are still an undeveloped area. Only limited monomers and reactions can be used for preparation of organic and coordination polymer particles. Another class of materials are organometallic compounds, which are characterised by metal-carbon bonds and are well known as important catalyst materials in catalysis. Although organometallic compounds are widely used as precursors for preparation of inorganic particles, they have so far not yet been prepared as micro- or nanometer-sized colloidal particles. On the other hand, to tailor the chemical properties of particles for catalysis applications is still a great challenge.

Many efforts have been made to develop heterogeneous NHC organometallic catalysts through immobilization methods. However, the development of solid poly-NHCs polymer is hitherto, surprisingly, an undeveloped area.

OBJECT OF THE INVENTION

It is the object of the present invention to overcome or substantially ameliorate at least one of the above disadvantages.

SUMMARY OF THE INVENTION

In one form of the invention there is provided a polymeric salt, said salt being capable of being converted into a polymeric carbene. The polymeric salt may comprise heterocyclic groups. A monomer unit of the polymeric salt may comprise two of the heterocyclic groups joined by a linker group. The linker group may be a rigid linker group. The heterocyclic groups may be in the main chain of the polymeric salt. The heterocyclic groups may be nitrogen heterocycles, and may comprise 1, 2 or 3 nitrogen atoms in the heterocyclic ring. The rings of the heterocycles may comprise 4-, 5-, 6- or 7-membered rings. The heterocycles may be aromatic or non-aromatic heterocycles. The heterocycles may be chiral. The nitrogen atoms may be disposed so as to enable a polymeric carbene formed from the polymeric salt to complex with a metal atom. The heterocyclic groups may be positively charged. The counterion of the polymeric salt may be a halide (e.g. chloride, bromide, iodide) or some other suitable negatively charged ion. There may be one or more than one (e.g. 2) types of counterion. The or each counterion may have a charge of −1 or −2. Thus the present invention provides a polymeric salt, wherein a monomer unit of the polymeric salt comprises two nitrogen containing heterocyclic groups joined by a linker group, e.g. a rigid linker group, such that nitrogen atoms of the heterocyclic groups are disposed so as to enable a polymeric carbene formed from the polymeric salt to complex with a metal atom. The polymeric carbene may be formed from the polymeric salt by reaction of the polymeric salt with a base. The polymeric salt may be a copolymer salt, comprising two or more (e.g. 2, 3, 4, 5, 6, 7, 8, 9 or 10) monomer units. Each of the monomer units may, independently, be as described above. Each monomer unit may comprise the same heterocyclic groups or different heterocyclic groups to each other monomer unit. Each monomer unit may comprise the same linker group or a different linker group to each other monomer unit. The polymeric salt may also comprise monomer units which are incapable of being converted to a carbene.

In a first aspect of the invention there is provided a polymeric salt comprising a monomer unit of structure (I) or a plurality of monomer units of structure (I). The structure comprises two rings each of which comprise two nitrogen atoms. The salt may optionally be substituted at C4 and/or C5, for example by an alkyl or aryl group. Each of the heterocyclic rings in structure (I) may independently be chiral or achiral. In structure (I), ═ represents either a single or a double bond. Thus the rings may be imidazolium rings or imidazolidinium rings, and the polymeric salt may be a polyimidazolium salt or a polyimidazolidinium salt

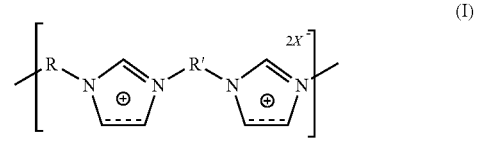

(I)

In structure (I), R and R' are linker groups. R' may be a rigid linker group. Suitable rigid linker groups R' include aromatic groups, heteroaromatic groups, cycloaliphatic groups, suitably rigid alkenes and suitably rigid alkynes Suitable R' groups include optionally substituted ethenyl, ethynyl, aryl, heteroaryl or cycloalkyl linker groups, e.g. —CH═CH— (cis or trans), phenylene (e.g. 1,4- or 1,3-phenylene) or pyridylene (e.g. 2,6-). R' may comprise a heteroatom (e.g. nitrogen) disposed so that, if the salt is converted to a polymeric carbene, and a metal atom is complexed to or bonded to said carbene, said heteroatom is also capable of complexing or bonding to the metal atom. R may be a rigid linker group, as described above for R', or may be a non-rigid or semi-rigid linker group, for example an alkyl, alkenyl (other than ethenyl), alkylaryl or other suitable linker group. Suitable non-rigid or semi-rigid linker groups R include —(CH$_2$)$_m$—, where m is between 1 and about 10, and these may be optionally substituted and/or branched. The end groups of the polymeric salt may be imidazole or imidazolidine groups and/or halide or some other leaving group. In structure (I), X$^-$ is a counterion, for example a halide. The degree of polymerisation of the polymeric salt may be sufficiently large that the salt is insoluble in the solvents used for the Suzuki reaction, or that a polymeric carbene or a poly-N-heterocyclic carbene metal complex made from the salt is insoluble in the solvents used for the Suzuki reaction. The degree of polymerisation may be greater than about 5, or greater than about 10, 15, 20, 30, 40, 50, 60, 70, 80, 90, 100, 200, 300, 400, 500, 600, 700, 800, 900 or 1000. It may be about 5, 6, 7, 8, 9, 10, 15, 20, 30, 40, 50, 60, 70, 80, 90, 100, 150, 200, 250, 300; 350, 400, 450, 500, 600, 700, 800, 900 or 1000. The polymeric salt may comprise a plurality of monomer units of structure (I), and may comprise greater than about 5 such monomer units, or greater than about 10, 15, 20, 30, 40, 50, 60, 70, 80, 90, 100, 200, 300, 400, 500, 600, 700, 800, 900 or 1000 such monomer units. It may comprise about 5, 6, 7, 8, 9, 10, 15, 20, 30, 40, 50, 60, 70, 80, 90, 100, 150, 200, 250, 300, 350, 400, 450, 500, 600, 700, 800, 900 or 1000 such monomer units.

In structure (I), and in related structures elsewhere in this specification, the representation of a positive charge in a structure such as

should be taken as incorporating two tautomeric structures as shown below. Thus the positive charge resides partially on each nitrogen atom.

The monomer(s) of structure (I) may be in the main chain of the polymeric salt. Thus the polymeric salt may be a main chain polyimidazolium salt or a main chain polyimidazolidinium salt.

It will be understood that in structure (I), ring carbon atoms 4 and/or 5 may optionally be substituted. Thus the polymeric salt may comprise a monomer unit of structure (Ia), wherein A, B, C and D are each, independently, hydrogen or a substituent which is not hydrogen. A, B, C and D may, independently, be hydrogen, alkyl (e.g. straight chain, branched chain, cycloalkyl), aryl (e.g. phenyl, naphthyl), hydrogen, halide (e.g. bromo, chloro), heteroaryl (e.g pyridyl, pyrrole), alkenyl (e.g. ethenyl, propenyl), alkynyl (e.g. ethynyl, propynyl) or some other substituent. A, B, C and D maybe all the same, or some or all may be different. The alkyl group may have between about 1 and 20 carbon atoms (provided that cyclic or branched alkyl groups have at least 3 carbon atoms), or between about 1 and 10 or 1 and 6 carbon atoms, and may be methyl, ethyl, propyl, butyl, cyclopentyl, cyclohexyl, isopropyl, isobutyl, tert-butyl etc. The substituents may be optionally substituted. The substituents may each, independently, be chiral or achiral.

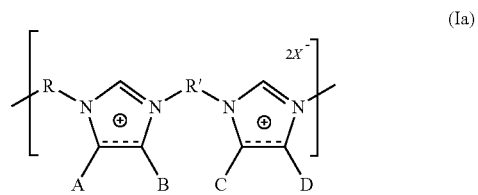

In structure (Ia), the bond represented as ═══ may be a single bond or a double bond. Thus structure (Ia) may have structure (Ia1) or (Ia2).

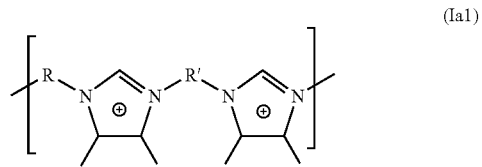

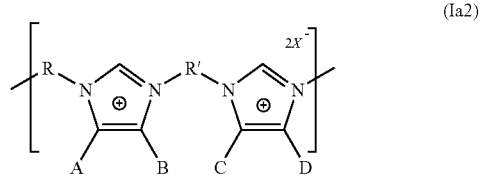

In structure (Ia1) C4 and C5 of each ring (the carbon atoms bearing substituents A, B, C and D) may each also bear a hydrogen atom, or may have an additional non-hydrogen substituent. Thus the monomer unit may have structure (Ib), wherein R, R', X, A, B, C and D are as defined above, and E, F, G and H are, independently, as defined for A, B, C and D.

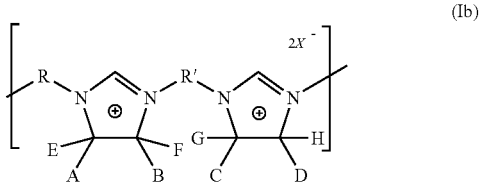

It will be clear that monomer units of structure (Ia1) and (Ib) may be asymmetric or chiral due to the distribution of substituents A to H, and monomer units of structure (Ia1), (Ia2) and (Ib) may be asymmetric due to chirality of one or more of substituents A to H.

The polymeric salt may be capable of catalysing a cyanation reaction.

In an embodiment there is provided a polymeric salt comprising a monomer unit of structure (I) wherein R is —(CH$_2$)

$_2$—, trans —CH═CH—, 2,6-pyridylene or 1,4-phenylene, R' is trans —CH═CH—, 2,6-pyridylene or 1,4-phenylene and X is bromide.

In another embodiment the polymeric salt has structure (Ic), (Id) or (Ie), where R, R', X and A to H are as defined earlier, and n is the degree of polymerisation. n may be sufficiently large that the salt is insoluble in the solvents used for the Suzuki reaction, or that a polymeric carbene or a poly-N-heterocyclic carbene metal complex made from the salt is insoluble in the solvents used for the Suzuki reaction. n may be greater than about 5, or greater than about 10, 15, 20, 30, 40, 50, 60, 70, 80, 90, 100, 200, 300, 400, 500, 600, 700, 800, 900 or 1000. n may be about 5, 6, 7, 8, 9, 10, 15, 20, 30, 40, 50, 60, 70, 80, 90, 100, 150, 200, 250, 300, 350, 400, 450, 500, 600, 700, 800, 900 or 1000.

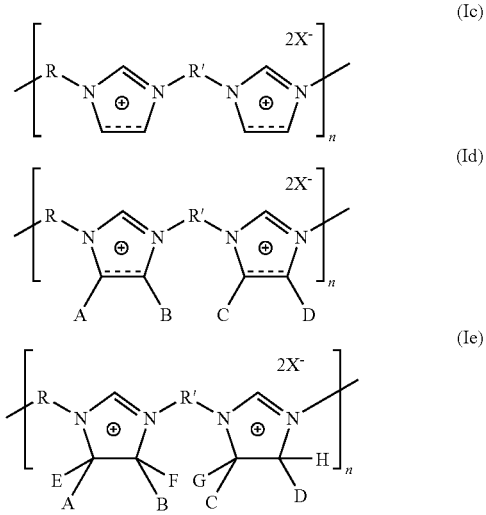

In another embodiment there is provided a copolymer salt comprising a first monomer unit and a second monomer unit, wherein the first unit comprises two nitrogen containing heterocyclic groups joined by a linker group such that nitrogen atoms of the heterocyclic groups are disposed so as to enable a polymeric carbene formed from the polymeric salt to complex with a metal atom, wherein:
  the first and the second monomer units are both bidentate; or
  the one of the first and second monomer units is bidentate and the other is tridentate or multidentate; or
  both the first and second monomer units are tridentate or multidentate.

One or both monomer units may have structure (I) as described above. The copolymer salt may be an alternating copolymer.

For a bidentate monomer unit, the linker group R' is not capable of coordinating (complexing) with a metal atom, such that, when the copolymer salt is converted into a polymeric carbene, the bidentate monomer unit forms a bidentate ligand unit capable of complexing with the metal atom in a bidentate fashion. A bidentate monomer unit may comprise a linker group which contains no heteroatom, such that when the monomer unit is converted to a bidentate ligand unit (i.e. the polymeric salt is converted to a polymeric carbene), coordination of the ligand unit with a metal atom is through one carbene on each heterocycle linked by the linker group. For a tridentate monomer unit, the linker group R' is capable of coordinating with a metal atom, such that, when the monomer unit is converted to a tridentate ligand unit (i.e. the polymeric salt is converted to a polymeric carbene), the tridentate ligand unit is capable of complexing with the metal atom in a tridentate fashion. Thus a tridentate monomer unit may comprise a linker group which comprises a nitrogen atom or some other heteroatom capable of coordinating (complexing) with a metal atom, such that the tridentate ligand unit produced from the tridentate monomer unit can coordinate through one carbene on each heterocycle linked by the linker group and through the heteroatom of the linker group. A multidentate ligand unit is capable of complexing with the metal atom in a multidenate fashion. It may therefore comprise a plurality of nitrogen atoms and/or other heteroatoms, e.g. 2, 3, 4 or 5.

In another embodiment, there is provided a copolymer salt comprising a first monomer unit and a second monomer unit, wherein the first and second monomer units each comprises two nitrogen containing heterocyclic groups joined by a linker group such that nitrogen atoms of the heterocyclic groups are disposed so as to enable a polymeric carbene formed from the polymeric salt to complex with a metal atom, whereby the first and the second monomer units are both bidentate. The copolymer salt may be particulate. The copolymer salt may have an amorphous microstructure.

In another embodiment there is provided a copolymer salt comprising a first is monomer unit and a second monomer unit, wherein the first and second monomer units each comprises two nitrogen containing heterocyclic groups joined by a linker group such that nitrogen atoms of the heterocyclic groups are disposed so as to enable a polymeric carbene formed from the polymeric salt to complex with a metal atom, whereby the one of the first and second monomer units is bidentate and the other is tridentate. The copolymer salt may be particulate. It may be in the form of micron-sized or nanometer sized colloidal particles. The copolymer salt may be in the form of spherical particles. The spherical particles may have a uniform particle size, or may have a narrow particle size distribution. 90% (or 80, 70, 60 or 50%) of the particles may have a particle size within about 10% (or about 20, 30, 40 or 50%) of the mean particle size (e.g. number average or weight average particle size). The ratio of the first monomer unit to the second monomer unit in the copolymer salt may be between about 1:100 and about 100:1 on a mole basis, or between about 1:10 and about 10:1 or between about 1:1 and about 2:1.

In another embodiment there is provided a copolymer salt comprising a first monomer unit and a second monomer unit, wherein the first and second monomer units each comprises two nitrogen containing heterocyclic groups joined by a linker group such that nitrogen atoms of the heterocyclic groups are disposed so as to enable a polymeric carbene formed from the polymeric salt to complex with a metal atom, whereby both the first and second monomer units are tridentate. The copolymer salt may be particulate. The copolymer salt may be in the form of microcrystalline particles.

In a second aspect of the invention there is provided a process for making a polymeric salt comprising a monomer unit of structure (I) comprising:
  treating an imidazolium salt or an imidazolidinium salt with a compound of structure Y—R'—Y' to form a bisimidazole or a bisimidazolidine; and
  copolymerising the bisimidazole or bisimidazolidine with a compound of structure X—R—X';
wherein X, X', Y and Y' are leaving groups and R and R' are linker groups, as described above. Any one of X, X', Y and Y' may be the same as or different to any other thereof, and may, independently, be any convenient leaving group, for example a halide (chloride, bromide, iodide); tosylate etc.

The process may comprise forming the imidazolium salt or imidazolidinium salt. The step of forming the imidazolium salt or imidazolidinium salt may comprise treating an imidazole or imidazolidine with a base, said base being sufficiently strong (i.e. sufficiently basic) to abstract a hydrogen atom from the imidazole or imidazolidine. A suitable base is sodium hydride.

There is also provided a polymeric salt comprising a monomer unit of structure (I) when made by the process of the second aspect.

In an embodiment there is provided a process for making a copolymer salt comprising:
  treating a first imidazolium salt with a compound of structure Y—R'—Y' to form a first bisimidazole;
  treating a second imidazolium salt with a compound of structure Y"—R'"—Y'" to form a second bisimidazole
  copolymerising the first and second bisimidiazoles with a compound of structure X"—R'"—X'";
  wherein X, X', X", X'", Y, Y', Y" and Y'" are leaving groups and R, R' and R" are linker groups, as described above. Any one of X, X', X", X'", Y, Y', Y" and Y'" may be the same as or different to any other thereof, and may, independently, be any convenient leaving group.

In a third aspect of the invention there is provided a poly-N-heterocyclic carbene metal complex (polyNHC metal complex) comprising a monomer unit of structure (II), wherein R, R' and X are as described above and M is a metal capable of complexing with one, or two carbene (—C:—) centres, and also optionally with a heteroatom. The structure comprises two rings each of which comprise two nitrogen atoms.

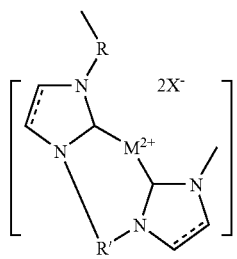

(II)

M may be a transition metal. It may be a platinum group metal. It may be a Group VIII metal. It may for example be palladium, copper, nickel or silver. Counterions X⁻ may be coordinated with metal M. In structure (II), ══ represents either a single or a double bond. Structure II and related structures of metal carbon complexes throughout this specification may be represented with a 2+ charge on M as shown above. They may alternatively be represented as having bonds linking the Xs to M.

It will be understood that in structure (II), ring, carbon atoms 4 and/or 5 may optionally be substituted. Thus poly-N-heterocyclic carbene metal complex may have structure (IIa), where A, B, C and D are as described earlier.

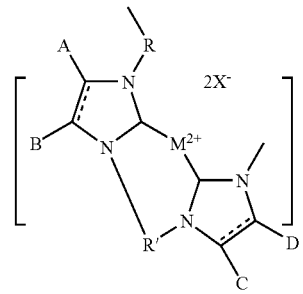

(IIa)

In structure (IIa), the bond represented as ══ may be a single bond or a double bond. Thus structure (IIa) may have structure (IIa1) or (IIa2).

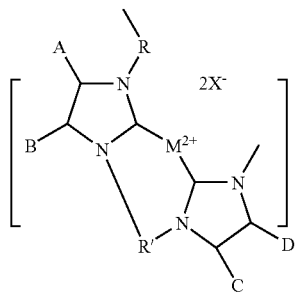

(IIa1)

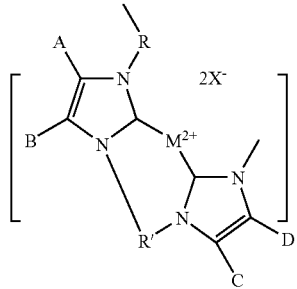

(IIa2)

In structure (IIa1) C4 and C5 of each ring (the carbon atoms bearing substituents A, B, C and D) may each also bear a hydrogen atom, or may have an additional non-hydrogen substituent. Thus the monomer unit may have structure (IIb), wherein R, R', X, A, B, C and D are as defined above, and E, F, G and H are, independently, as defined for A, B, C and D.

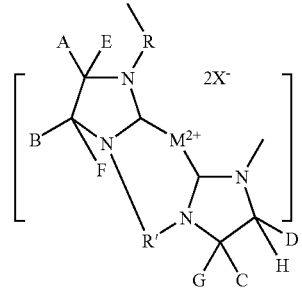

(IIb)

It will be clear that monomer units of structure (IIa1) and (IIb) may be asymmetric or chiral due to the distribution of substituents A to H, and monomer units of structure (IIa1), (IIa2) and (IIb) may be asymmetric due to chirality of one or more of substituents A to H.

The poly-N-heterocyclic carbene metal complex may be capable of catalysing a cyanation reaction or a Suzuki reaction.

In an embodiment there is provided a polymeric salt comprising a monomer unit of structure (II) wherein R is —(CH$_2$)$_2$—, trans —CH=CH—, 2,6-pyridylene or 1,4-phenylene, R' is trans —CH=CH—, 2,6-pyridylene or 1,4-phenylene and X is bromide.

In another embodiment there is provided a poly-N-heterocyclic carbene metal complex (polyNHC metal complex) of structure (IIb), (IIc) or (IIe), where M, X, R, R', A, B, C, D, E, F, G and H are as defined before, and n is the degree of polymerisation. n may be sufficiently large that the poly-N-heterocyclic carbene metal complex is insoluble in the solvents used for the Suzuki reaction. n may be greater than about 5, or greater than about 10, 15, 20, 30, 40, 50, 60, 70, 80, 90, 100, 200, 300, 400, 500, 600, 700, 800, 900 or 1000. n may be about 5, 6, 7, 8, 9, 10, 15, 20, 30, 40, 50, 60, 70, 80, 90, 100, 150, 200, 250, 300, 350, 400, 450, 500, 600, 700, 800, 900 or 1000.

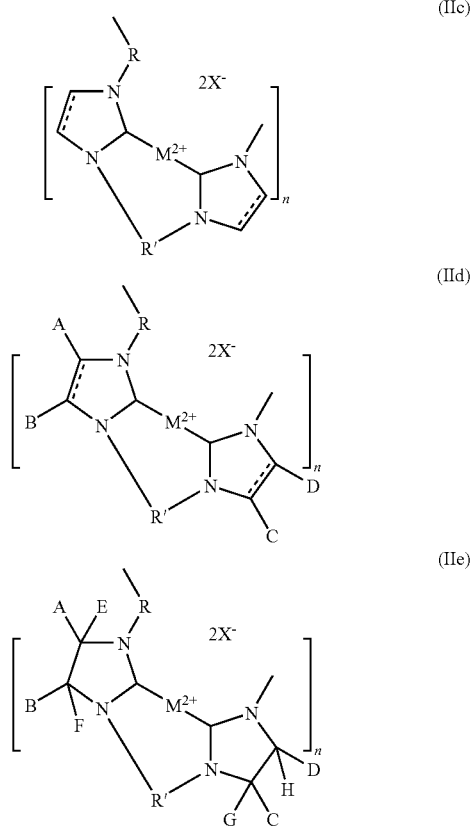

In a fourth aspect of the invention there is provided a process for making a poly-N-heterocyclic carbene metal complex comprising:
treating a polymeric salt comprising a monomer unit of structure (I) (e.g. a polymeric salt according to the first aspect of the invention) with a base to form a polymeric intermediate; and
treating the polymeric intermediate with a salt of the metal.

The metal may as described in the third aspect of the invention (for M), and R, R' and X may be as described earlier. The base may sufficiently strong (basic) to convert the polymeric salt into the intermediate. The base may be for example sodium tert-butoxide, potassium tert-butoxide, sodium hydride, sodium amide or some other suitable base. The intermediate may be a polymeric carbene, and may be a poly-N-heterocyclic carbene (polyNHC). The salt of the metal may be an acetate or some other convenient salt.

In a fifth aspect of the invention there is provided a process for making a poly-N-heterocyclic carbene metal complex comprising treating a polymeric salt comprising a monomer unit of structure (I) (e.g. a polymeric salt according to the first aspect of the invention) with a salt of the metal. The metal may be palladium or silver. The salt may be a halide or an acetate of the metal, e.g. a chloride or a bromide, i.e. the salt may be palladium chloride, palladium bromide, silver chloride, silver bromide, palladium acetate, silver acetate or may be a mixture of any two or more of these.

There is also provided a poly-N-heterocyclic carbene metal complex when made by the process of the fourth or fifth aspect. Thus there is provided a poly-N-heterocyclic carbene metal complex made by reacting a salt of the metal with either a polymeric salt comprising a monomer unit of structure (I) as defined above or with a polymeric intermediate formed by treating said polymeric salt with a base.

In a sixth aspect of the invention there is provided a method for performing a chemical reaction comprising exposing the reagent or reagents for said reaction to a poly-N-heterocyclic carbene metal complex or a polymeric salt or a polymeric carbene according to the present invention. The metal may be a transition metal. It may be a platinum group metal. It may be a Group VIII metal. It may for example be palladium, copper, nickel or silver. The reaction may be a coupling reaction. It may be a Suzuki reaction or a cyanation reaction. The Suzuki reaction involves coupling of an aryl or vinyl boronic acid and an aryl or vinyl halide (e.g. chloride or bromide) or triflate. The method may also comprise separating the polyNHC metal complex or polymeric salt or polymeric carbene from the reaction mixture. It may comprise separating the product of the reaction from the reaction mixture.

There is also provided a reaction product (e.g. a Suzuki reaction product or a cyanation reaction product) when made by the process of the sixth aspect. The invention also encompasses the use of a poly-N-heterocyclic carbene metal complex or a polymeric salt or a polymeric carbene according to the present invention for performing, optionally for catalysing, a chemical reaction, e.g. a Suzuki reaction.

In a seventh aspect of the invention there is provided a polymeric carbene comprising a monomer unit of structure (III). The structure comprises two rings each of which comprise two nitrogen atoms. The rings may optionally be substituted at C4 and/or C5. R and R' may be linker groups, as described earlier. In structure (III), ═ represents either a single or a double bond. The monomer unit of structure (III) may be in the main chain of the polymeric carbene. Thus the polymeric carbene may be a main chain polymeric carbene. The polymeric carbene may be capable of catalysing a cyanation reaction.

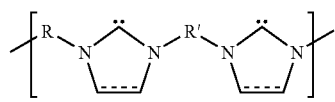
(III)

It will be understood, as described earlier for related materials (e.g. the polymeric salt), that if one or both of the rings are substituted, the structure of the polymeric carbene will be as shown in structure (IIIa). In (IIIa), A, B, C and D are as described earlier.

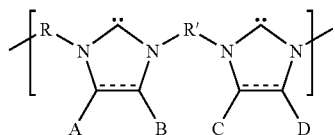
(IIIa)

The degree of polymerisation may be such that the polymeric carbene is substantially insoluble in solvents used in the Suzuki reaction. The polymeric carbene may comprise a plurality of monomer units of structure (III), and may comprise greater than about 5 such monomer units, or greater than about 10, 15, 20, 30, 40, 50, 60, 70, 80, 90, 100, 200, 300, 400, 500, 600, 700, 800, 900 or 1000 such monomer units. It may comprise about 5, 6, 7, 8, 9, 10, 15, 20, 30, 40, 50, 60, 70, 80, 90, 100, 150, 200, 250, 300, 350, 400, 450, 500, 600, 700, 800, 900 or 1000 such monomer units. The carbene of structures (III) and (IIIa), and related carbene structures described elsewhere in the present specification may be at least partially stabilised by one or more adjacent heteroatoms (e.g. two adjacent nitrogen atoms in structures III and IIIa).

The poly-N-heterocyclic carbene metal complex may be capable of catalysing a cyanation reaction or a Suzuki reaction.

In structure (IIa), the bond represented as ═ may be a single bond or a double bond. Thus structure (IIIa) may have structure (IIIa1) or (IIIa2).

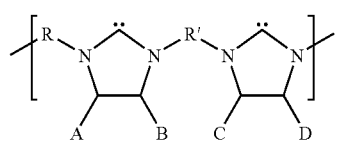
(IIIa1)

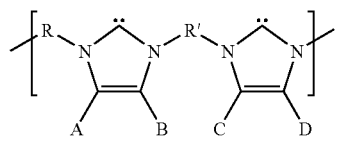
(IIIa2)

In structure (IIIa1) C4 and C5 of each ring (the carbon atoms bearing substituents A, B, C and D) may each also bear a hydrogen atom, or may have an additional non-hydrogen substituent. Thus the monomer unit may have structure (IIIb), wherein R, R', X, A, B, C and D are as defined above, and E, F, G and H are, independently, as defined for A, B, C and D.

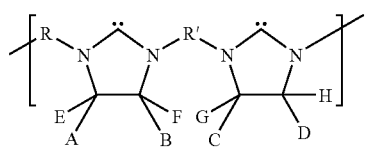
(IIIb)

It will be clear that monomer units of structure (IIIa1) and (IIIb) may be asymmetric or chiral due to the distribution of substituents A to H, and monomer units of structure (IIIa1), (IIIa2) and (IIIb) may be asymmetric due to chirality of one or more of substituents A to H.

In an embodiment there is provided a polymeric carbene comprising a monomer unit of structure (III) wherein R is —(CH$_2$)$_2$—, trans —CH═CH—, 2,6-pyridylene or 1,4-phenylene, R' is trans —CH═CH—, 2,6-pyridylene or 1,4-phenylene and X is bromide.

In another embodiment the polymeric carbene has structure (IIIc), (IIId) or (IIIe), where R, R', A, B, C, D, E, F, G and H are as defined before, and n is the degree of polymerisation of the polymeric carbene. n may be sufficiently large that the polymeric carbene is insoluble in the solvents used for the Suzuki reaction. n may be greater than about 5, or greater than about 10, 15, 20, 30, 40, 50, 60, 70, 80, 90, 100, 200, 300, 400, 500, 600, 700, 800, 900 or 1000. n may be about 5, 6, 7, 8, 9, 10, 15, 20, 30, 40, 50, 60, 70, 80, 90, 100, 150, 200, 250, 300, 350, 400, 450, 500, 600, 700, 800, 900 or 1000.

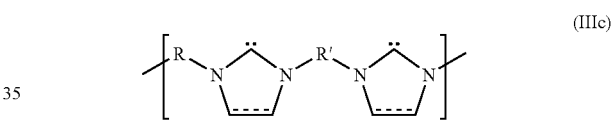
(IIIc)

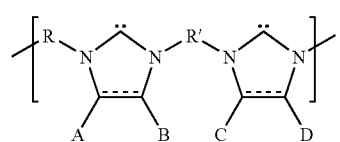
(IIId)

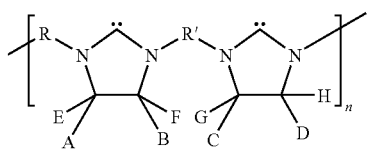
(IIIe)

BRIEF DESCRIPTION OF THE DRAWINGS

Preferred forms of the present invention will now be described by way of example with reference to the accompanying drawings wherein.

DETAILED DESCRIPTION OF PREFERRED EMBODIMENTS

Figure 1:
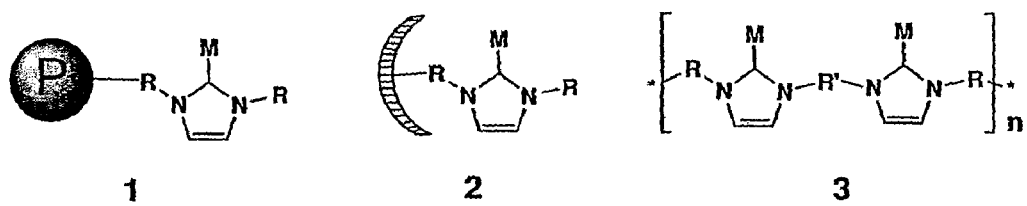
FIG. 1 shows different types of supported NHC metal complexes.

The present invention relates to polymeric salts which may be converted to polymeric carbenes and/or polymeric carbene metal complexes. The conversion to polymeric carbenes may be effected by reaction of the salts with a suitable base, and is conversion of the polymeric salts to polymeric carbene metal complexes may be effected by reaction with a salt of a suitable metal ion, e.g. a transition metal ion.

The polymeric salt may comprise heterocyclic groups, and a monomer unit of the polymeric salt may comprise two of the heterocyclic groups joined by a linker group. For example a polymeric salt according to the present invention may comprise a monomer unit of structure IV. The polymeric salt may have structure IVa. The polymeric salt may be converted into a polymeric carbene. The polymeric carbene may have a monomer unit of structure V. The polymeric carbene may have structure Va. The polymeric carbene may be converted into a polymeric carbene metal complex having a monomer unit of structure VI. The polymeric carbene metal complex may have structure VIa. Alternatively, the polymeric salt may converted into the polymeric carbene complex.

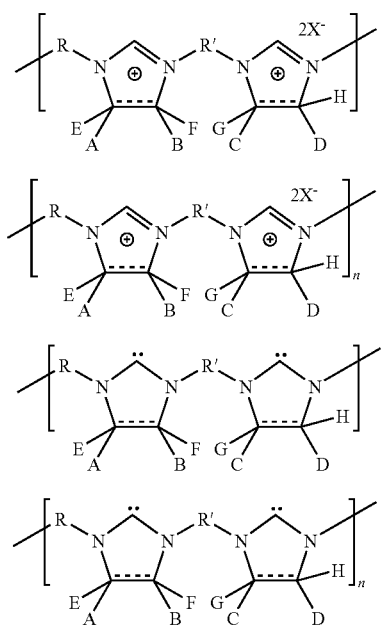

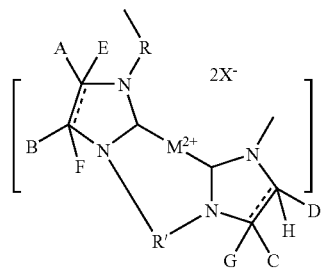

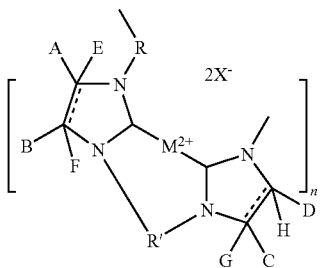

In structures IV, IVa, V, Va, VI and VIa, ≈ represents either a single or a double bond, wherein, if ≈ represents a double bond, substituents E, F, G and H are not present. Substituents A, B, C and D, and, if present, E, F, G and H may each, independently, be hydrogen or a substituent which is not hydrogen. They may, independently, be hydrogen, alkyl (e.g. straight chain, branched chain, cycloalkyl), aryl (e.g. phenyl, naphthyl), halide (e.g. bromo, chloro), heteroaryl (e.g pyridyl, pyrrolyl, furanyl, furanylmethyl, thiofuranyl, imidazolyl), alkenyl (e.g. ethenyl, 1-, or 2-propenyl), alkynyl (e.g. ethynyl, 1- or 3-propynyl, 1-, 3- or 4-but-1-ynyl, 1- or 4-but-2-ynyl etc.) or some other substituent. A, B, C and D and, if present, E, F, G and H, maybe all the same, or some or all may be different. The alkyl group may have between about 1 and 20 carbon atoms (provided that cyclic or branched alkyl groups have at least 3 carbon atoms), or between about 1 and 10 or 1 and 6 carbon atoms, and may for example be methyl, ethyl, 1- or 2-propyl, isopropyl, 1- or 2-butyl, isobutyl, tert-butyl, cyclopentyl, cyclopentylmethyl, cyclohexyl, cyclohexylmethyl, methylcyclohexyl etc. The substituents may be optionally substituted (e.g. by an alkyl group, an aryl group, a halide or some other substituent) or may comprise a heteroatom such as O, S, N (e.g. the substituent may be methoxymethyl, methoxyethyl, ethoxymethyl, polyoxyethyl, thiomethoxymethyl, methylaminomethyl, dimethylaminomethyl etc.). Substituents A, B, C and D, and, if present, E, F, G and H may each, independently, be chiral or achiral.

It will be understood that any two of A, B, C and D, and, if present, E, F, G and H may be joined to form a cyclic structure. Thus the rings of structures IV, IVa, V, Va, VI and VIa may have fused or spiro-joined rings. For example if ≈ represents a single bond, A and E (or any other pair of substituents attached to the same carbon atom) may be joined to form a cyclopentyl, cyclohexyl or some other ring. In the case where A and E form a cyclopentyl ring, this would for example form a 1,3-diazaspiro[4.4]nonane structure. Alternatively, A and B (or any other pair of substituents attached to adjacent carbon atoms) may be joined to form a cyclopentyl, cyclohexyl or some other ring. In the case where A and B form a cyclopentyl ring, this would for example form a 1,3-diazabicyclo[3.3.0]octane structure. Further, if ≈ represents a single bond, A and E (or any other pair of substituents attached to the same carbon atom) may represent a single substituent joined to a ring carbon atom by a double bond. Thus for example monomer unit I may have structure VIIa, VIIb or VIIc. Those skilled in the art will readily appreciate that other variants are possible and are included in the scope of this disclosure.

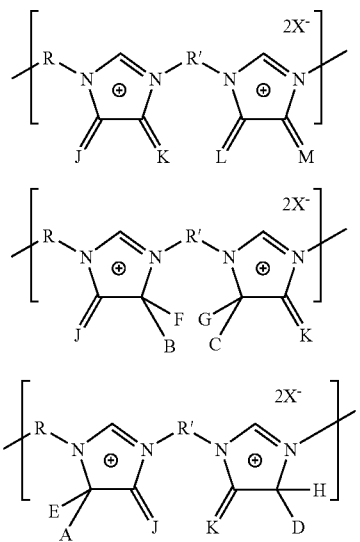

VIIa

VIIb

VIIc

In structures VIIa, VIIb and VIIc, J, K, L and M may independently be =CPQ or =NP, where P and Q are independently, as defined earlier for A to H. For example they may be =CH$_2$, =CHCH$_3$, =CHPh, =NCH$_3$ or =NPh, or some other suitable double bonded group. Similar structures may be present in each of As a further alternative, if ═══represents a double bond, the rings of structure IV, IVa, V, Va, VI and VIa may be fused with an aromatic or heteroaromatic ring. Thus for example monomer unit I may have structure VIII (optionally substituted on the aromatic ring).

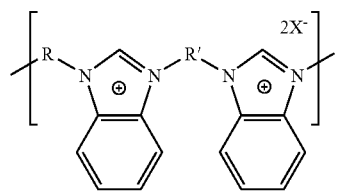

VIII

It will be apparent to one skilled in the art that the processes for making the polymeric salts, polymeric metal complexes and polymeric carbenes described in the present specification will be equally applicable to all of structures IV, IVa, V, Va, VI and VIa (and VIIa, VIIb and VIIc). Thus for example a polymeric salt comprising monomer unit VIII may be made by treating a benzimidazolium salt with a compound of structure Y—R'—Y' to form a bisbenzimidazole and copolymerising the bisbenzimidazole with a compound of structure X—R—X'. The benzimidazolium salt may be made by treating a benzimidazole with a base, said base being sufficiently strong to abstract a hydrogen atom from the benzimidazole. The polymeric salt comprising monomer unit VIII may then be used to make the corresponding polymeric metal complex and/or polymeric carbene, as described elsewhere for similar conversion. The benzimidazole used in the above process may be obtained by methods well known in the art.

In structures IV, IVa, V, Va, VI and VIa (and VIIa, VIIb and VIIc), R and R' are linker groups. R' may be a rigid linker group. Suitable rigid linker groups R and R' include aromatic groups, heteroaromatic groups, cycloaliphatic groups, suitably rigid alkenes and suitably rigid alkynes. Suitable R and R' groups include optionally substituted ethenyl (e.g. ethenediyl, propen-1,2-diyl, 2-butene-2,3-diyl), ethynyl (e.g. ethynediyl, propynediyl, but-2,3-yne-1,4-diyl), aryl (1,3-phenylene, 1,4-phenylene, 1,3-naphthylene, 1,4-naphtylene, 1,5-naphthylene, 1,6-naphthylene, 1,7-naphthylene, 1,8-naphthylene), heteroaryl (e.g. 2,6-pyridinediyl, 2,6-pyrandiyl, 2,5-pyrrolediyl), or cycloalkyl linker groups (e.g. 1,3-cyclohexanediyl, 1,4-cyclohexanediyl, 1,3-cyclopentanediyl, 1,3-cyclobutanediyl) groups. Suitable non-rigid or semi-rigid linker groups R include —(CH$_2$)$_m$—, where m is between 1 and about 10, and these may be optionally substituted and/or branched, e.g. 1,2-ethanediyl, 1,2- or 1,3-propanediyl, 1,2-, 1,3-, 1,4- or 2,3-butanediyl, 2-methylbutane-3,4-diyl etc. X$^-$ is a counterion, for example a halide. It may be for example bromide, chloride, iodide, acetate, nitrate, trifluoroacetate etc. R may be optionally substituted (e.g. by an alkyl group, an aryl group, a halide or some other substituent) or may comprise a heteroatom such as O, S, N (e.g. R may be —CH$_2$OCH$_2$—, —CH$_2$OCH$_2$CH$_2$—, —CH$_2$OCH(CH$_3$)—, —(CH$_2$OCH$_2$)$_p$— (p between 1 and about 100), —CH$_2$NHCH$_2$—, CH$_2$N(CH$_3$)CH$_2$—, —CH$_2$N (Ph)CH$_2$—, —CH$_2$SCH$_2$— etc.).

The monomer(s) of structure IV, V or VI (or VIIa, VIIb or VIIc) may be in the main chain of the respective polymeric molecules.

A monomer which may be used for making the polymeric salt of the present invention may be made by treating a salt of a suitable heterocycle with a linking compound. The salt of the suitable heterocycle comprises an anion of the heterocycle and a cation. The heterocycle may be a nitrogen heterocycle. It may have 4, 5, 6 or 7 atoms in the ring, of which 1, 2 or 3 may be nitrogen atoms. It may be a heterocycle such that, if a ring carbon is a carbene, the heterocycle is aromatic, although this is not necessarily the case. The carbene may be stabilised by at least one, optionally two, adjacent nitrogen atoms or other heteroatoms. The heterocycle may have at least to coupling sites, for coupling to linking compounds. Each coupling site may be for example a ring nitrogen atom, or may be a functional substituent (e.g. ester, carboxylic acid, halide etc.). The heterocycle may be for example imidazole or imidazolidine, optionally substituted on C4 and/or C5 (e.g. 4,5-diphenyl-imidazolidine), or an optionally substituted triazole. The heterocycle may be a chiral, or asymmetric, heterocycle. It may be present as a single chiral isomer. The imidazole or imidazolidine may be substituted by an aromatic group (e.g. phenyl, naphthyl etc. optionally substituted) or an alkyl group (e.g. C1 to C12 straight chain, or C3 to C12 branched or cyclic, such as methyl, ethyl, propyl, isopropyl, cyclohexyl, cyclohexylmethyl etc.). The cation may be for example sodium, potassium or lithium. The linking compound may have structure Y—R'—Y'. Y and Y' may be the same of different, and may, independently, be for example a halide (e.g. chloride or bromide), tosylate etc. Y and Y' may be such that they can be substituted by the anion of the heterocycle. R' is a linker group, for example a rigid or non-rigid linker group. It may have between about 1 and 20 atoms or more. It may be an alkyl or an aryl or a heterocycle linker (e.g. pyridyl, methylene, ethylene, 1,2-, 1,3- or 1,4-phenylene, —CH═CH—, —cycloC$_6$H$_{10}$—, —CH$_2$C(CH$_3$)CH$_2$— etc.). Thus in a representative synthesis, a heterocycle is treated with a base (e.g.

NaH, LDA etc.) to form the anion of the heterocycle. This reaction is commonly conducted in a dipolar apolar solvent (e.g. DMF, NMP, DMSO etc.). It may be conducted at room temperature or at some convenient elevated temperature (e.g. 25, 30, 35, 40, 45 or 50° C.). The molar ratio of base to linking compound should be about 2:1, but may be between about 1.5:1 and 3:1, or between about 1.8:1 and 2.2:1, 1.8:1 and 2:1 or 2:1 and 2.2:1 (e.g. about 1.8:1, 1.9:1, 2.1:1 or 2.2:1). The resulting heterocycle salt may be reacted without isolation with the linking compound. Thus to the solution of the heterocycle salt, obtained as described above, the linking compound may be added in a molar ratio of heterocycle salt to linking compound of about 2:1, or between about 1.5:1 and 3:1, or between about 1.8:1 and 2.2:1, 1.8:1 and 2:1 or 2:1 and 2.2:1 (e.g. about 1.8:1, 1.9:1, 2.1:1 or 2.2:1). This reaction may be conducted under a similar range of conditions (solvent, temperature) as the formation of the heterocycle salt, as described above. The resulting bisheterocycle monomer may be isolated by standard organic chemical procedures.

The bisheterocycle monomer may be converted into the polymeric salt of the invention by copolymerising with a second linker compound of structure X—R—X'. X and X' may be the same or different, and may, independently, be selected from the same collection of groups as Y and Y', as described above. Each may be the same as or different to each Y or Y'. R may be the same as or different to R', and may be selected from the same collection of linker groups as R', as described above. A second bisheterocycle, and optionally a third, fourth, fifth etc. bisheterocycle, may be also copolymerised to form the polymeric group. For example, if a second bisheterocycle is copolymerised, a mixture of the two bisheterocycles may be copolymerised with the second linker compound described above. The two heterocycles may for example comprise different linker groups R'. In a representative process for producing the polymeric salt, therefore, the bisheterocycle, or a mixture of bisheterocycles, in a solvent, commonly a dipolar aprotic solvent (e.g. DMF, DMSO, NMP) is treated with the second linker compound. The molar ratio of bisheterocycle (or mixture of bisheterocycles) to second linker compound should be about 1:1, but may be between about 1.2:1 and 0.8:1, or about 1.1:1 and 0.9:1, for example about 1.2:1, 1.1:1, 1:1, 0.9:1 or 0.8:1, or some other ratio. The reaction is commonly conducted at elevated temperature, e.g. above about 80° C., or above about 90, 100, 110 or 120° C., and may be conducted at about 80, 90, 100, 110 or 120° C. The time of reaction should be sufficient for at least 50% conversion, or at least about 60, 70 or 80% conversion, and will depend on the reagents and the temperature, but may be at least about 10, 12, 14 or 16 hours.

The resulting polymeric salt may be converted into a poly-N-heterocyclic carbene metal complex (polyNHC metal complex). For certain metals, such as silver or palladium, this may be accomplished by treating the polymeric salt with a salt of the metal. The reaction may be conducted in any convenient solvent. The solvent may be polar. It may be aprotic. It may for example be DMF, DMSO, NMP etc. The molar ratio of metal salt to bisheterocycle monomer unit of the polymeric salt may be between about 1:2 and about 2:1, or between about 1:2 and 1:1, 1:1 and 2:1 or 1:1.5 and 1.5:1, for example about 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9 or 1:2. The salt may be any convenient salt e.g. a halide, and acetate, a sulfate etc. or a mixture of convenient salts. The reaction may be conducted at elevated temperatures (preferably not exceeding the boiling point of the solvent) or at a variety of elevated temperatures. The or each temperature may be between about 25 and about 150° C., or between about 50 and 150, 100 and 150, 25 and 100, 25 and 50, 50 and 100 or 50 and 120° C., e.g. about 25, 30, 35, 40, 45, 50, 60, 70, 80, 90, 100, 110, 120, 130, 140 or 150° C. The reaction time may be sufficient for conversion of the polymeric salt to the polyNHC metal complex. The conversion may be at least about 70%, or at least about 75, 80, 85 or 90%. The reaction time may be between about 1 and 10 hours, or between about 1 and 5, 5 and 10 or 2 and 8 hours, e.g. 1, 2, 3, 4, 5, 6, 7, 8, 9 or 10 hours, and may depend on the reaction temperature(s). The reaction may be a heterogeneous reaction, i.e. the polymeric salt may be at least partially undissolved in the solvent, or it may be a homogeneous reaction in which, the polymeric salt is in solution. The polyNHC metal complex may be formed as particles. The particles may be separated from the reaction mixture by filtration, centrifugation, membrane separation or some other suitable separation process. The separated, particles may then be washed with a solvent (which may be the same as or different to the solvent used for the reaction) and may be dried, e.g. by heating, freeze drying, vacuum drying, passing a gas over or through the particles, or by some other suitable process.

In an alternative process, the polymeric salt may be converted into a polyNHC metal complex by treating the polymeric salt with a base to form a polymeric intermediate and treating the polymeric intermediate with a salt of the metal. The metal may be capable of complexing with one, or two carbene centres, and also optionally with a heteroatom. It may be a transition metal. It may be a platinum group metal. It may be a Group VIII metal. It may for example be palladium, copper, nickel or silver. The base may sufficiently strong (basic) to convert the polymeric salt into the intermediate. The base may be for example sodium tert-butoxide, potassium tert-butoxide, sodium hydride, sodium amide or some other suitable base. The intermediate may be a polymeric carbene, and may be a poly-N-heterocyclic carbene (polyNHC). The salt of the metal may be an acetate or a halide (e.g. chloride or bromide) or some other convenient salt. The step of treating the polymeric salt with the base may be conducted in a solvent. The solvent may be an organic solvent. It may be a polar organic solvent. It may be a polar aprotic solvent. It may be for example DMF, NMP etc. It may be a mixture of solvents. This step may be conducted at room temperature, or at some other convenient temperature. It may be conducted between about 5 and 50° C., or between about 5 and 30, 5 and 20, 5 and 10, 10 and 50, 20 and 50, 30 and 50, 10 and 40 or 2 and 30° C., for example at about 5, 10, 15, 20, 25, 30, 35, 40, 45 or 50° C. The reaction may take between about 0.5 and about 12 hours. The time for the reaction may depend on the nature of the reagents, temperature, solvent etc. It may be between about 0.5 and 10, 0.5 and 5, 0.5 and 2, 1 and 10, 1 and 6, 1 and 3, 3 and 12, 6 and 12 or 4 and 8 hours, for example about 0.5, 1, 2, 3, 4, 5, 6, 7, 8, 9, 10, 11 or 12 hours. The resulting polymeric intermediate (e.g. polymeric carbene) may be isolated by filtration or some other separation process. It may then be reacted in a solvent (similar to the solvent described above) with a metal salt (e.g. metal chloride, bromide, acetate etc.) to form a polyNHC metal complex. Reaction with the metal salt may take between about 1 and about 12 hours, or between about 1 and 10, 1 and 6, 1 and 3, 3 and 12, 6 and 12 or 4 and 8 hours, for example about 1, 2, 3, 4, 5, 6, 7, 8, 9, 10, 11 or 12 hours. It may be conducted at between about 20 and about 100° C., or between about 20 and 50, 20 and 30, 30 and 100, 50 and 100, 40 and 80 or 50 and 70° C., for example about 20, 30, 40, 50, 60, 70, 80, 90 or 100° C.

In some circumstances, the polymeric carbene (e.g. 12aA) may be isolated. The polymeric carbene may be used in its own right as a catalyst for heterogeneous catalysis of chemical reactions such as the Suzuki reaction, cyanation of carbonyl compounds etc.

In examples of the syntheses described above, 12aA and 12aC (M=Cu) (FIG. 7) were made as follows.

Preparation of 12aA: NaO(C(CH$_3$)$_3$) (40 mg, 0.5 mmol) was added to a DMF (10 ml) suspension of 3a (150 mg) in a reaction flask. The reaction mixture was stirred for 4 hours. The solid product was filtered and carefully washed with DMF to remove NaBr salt to obtain pale yellow powder 12aA. Elemental analysis of the yellow powder found: C, 58.01, H, 6.05, N, 12.25 (calculated result for polymeric carbene 12aA: C, 58.71, H, 6.62, N, 12.84). $^{13}$C NMR (solid): δ 16.4(CH$_3$), 48.2(CH$_2$, C—O)), 128-163(C=C), 220(C2 carbene). PA-IR (cm$^{-1}$): 1558(s, C=C). Under SEM, particles of 12a and 12aA appeared very similar.

Preparation of 12aC-Cu. NaO(C(CH$_3$)$_3$) (50 mg, 0.5 mmol) was added to a DMF (10 ml) suspension of 3a (250 mg) in a reaction flask. The reaction mixture was stirred for 1 hour and then CuCl (50 mg, 0.5 mmol) was added. The reaction mixture was stirred at 80° C. for another 6 hours The solid product was filtered and dried to get white powder 12aC-Cu. $^{13}$C NMR (solid): δ 21.6(CH$_3$), 54(CH$_2$), 120-150 (C=C), 185(weak, C—Cu). PA-IR (cm$^{-1}$): 1670(m, C=C). Cu loading 11 wt % by TG.

Figure 8:
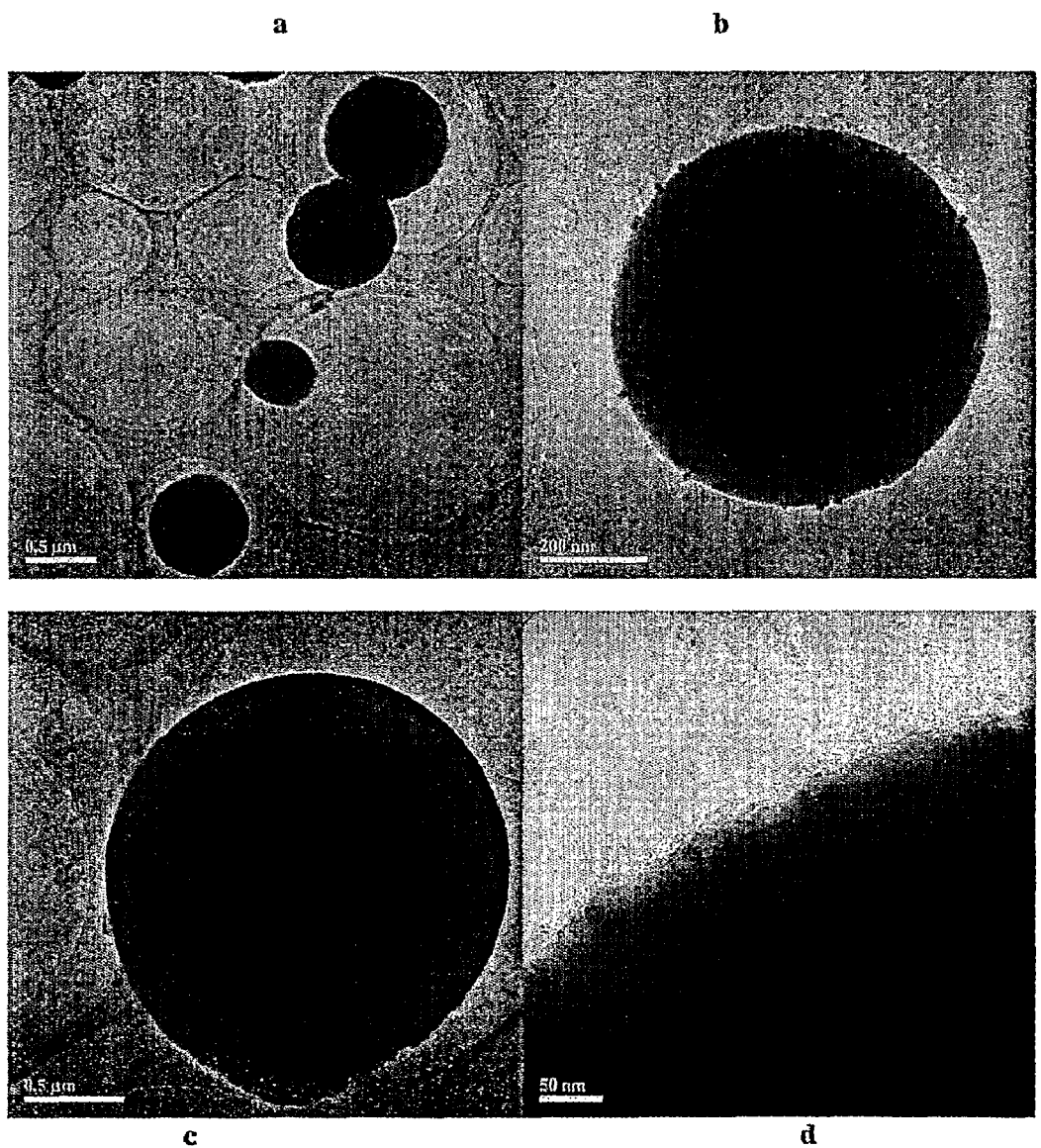
FIG. 8 shows transmission electron micrographs of the polymeric particles of FIG. 7: a) 12aC-Ag, b) 12aC-Ag made using excess silver, c) 12aC-Pd, d) 12aC-Pd made using excess palladium.

FIG. 8 shows TEM images of the polymeric particles with metal nanoparticles. FIG. 8a shows particles 12aC-Ag. The loading of silver in these particles was 8 wt %. The TEM image does not show any silver nanoparticles. FIG. 8b shows particles 12aC-Ag in which the loading of silver was 17 wt %. The TEM image clearly shows silver nanoparticles attached to the polymer particle. FIG. 8c shows 12aC-Pd in which the loading of palladium was 6.5 wt %. The TEM image does not show any palladium nanoparticles. FIG. 8d shows 12aC-Pd in which the loading of palladium was 17 wt %. The TEM image clearly shows palladium nanoparticles in the polymer particle. Thus when excess metal is used in making the polymeric particles, it appears that metal nanoparticles are produced which attach to the polymeric particles.

The polymeric salts and polyNHC metal complexes may be in the form of amorphous particles, spherical particles or microcrystalline particles. The particles may be colloidal particles. The particles may be micron-sized or nanometer-sized colloidal particles. The particles may be between about 100 nm to about 10 microns in diameter. They may have a diameter between about 100 nm and 1 micron, 100 and 500 nm, 500 nm and 10 microns, 1 and 10 microns, or 100 m and 1 micron, for example about 100, 200, 300, 400, 500, 600, 700, 800 or 900 nm, or about 1, 1.5, 2, 2.5, 3, 3.5, 4, 4.5, 5, 6, 7, 8, 9 or 10 microns. The size and shape of the particles may depend on the nature of the bisheterocycle monomer(s) used, and the conditions of synthesis of the polymeric salt, particularly the solvent used in the polymerisation process.

The polyNHC metal complexes of the present invention may be used to catalyse a chemical reaction, e.g. a Suzuki reaction. The Suzuki reaction comprises coupling of an aryl halide substrate (e.g. an aryl chloride, bromide or iodide) with an aryl boronic acid ragent to produce a biaryl. The reaction is generally conducted in the presence of a catalyst. The reaction may be conducted by combining the substrate and the reagent in a suitable solvent in the presence of the polyNHC metal complexes and a base such as a caesium salt (e.g. caesium carbonate). Other bases may also be used, e.g. K$_2$CO$_3$, Na$_2$CO$_3$, NaOAc. The base may function as an acid scavenger. Commonly the complex is added at about 1 mol % relative to the substrate, for example between about 0.1 and 10 mol %, or between 0.1 and 1, 1 and 10, 0.5 and 10, 0.5 and 5, 0.5 and 2, 0.5 and 1, 1 and 2 or 1 and 5 mol %, e.g. about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9 or 10 mol %. The substrate may be present at between about 0.1 and 1 mol equivalents relative to the cocatalyst for example between about 0.1 and 0.5, 0.5 and 1, 0.2 and 0.8, 0.3 and 0.7 or 0.4 and 0.6 mol equivalents (e.g. about 0.1, 0.2, 0.3, 0.4, 0.5, 0.6, 0.7, 0.8, 0.9 or 1 mol equivalents). The reagent may be present at between about 1 and 2 mole equivalents relative to the substrate, or between about 1 and 1.5, 1.5 and 2, 1.2 and 1.8, 1.3 and 1.7 or 1.4 and 1.6 mol equivalents, e.g. about 1, 1.1, 1.2, 1.3, 1.4, 1.5, 1.6, 1.7, 1.8, 1.9 or 2 mol equivalents. The cocatalyst may be added at between about 1 and 3 mol equivalents relative to the substrate, or between about 1 and 2, 2 and 3, 1.5 and 2.5, 1.7 and 2.3 or 1.9 and 2.1 mol equivalents, e.g. about 1, 1.1, 1.2, 1.3, 1.4, 1.5, 1.6, 1.7, 1.8, 1.9 or 2 mol equivalents. The solvent may be any convenient solvent. It may be miscible with water or immiscible with water. It may be for example DMF, toluene or dioxane. It may be a mixture of an organic solvent and water (e.g. an about 10:1, 9:1, 8:1, 7:1, 6:1, 5:1, 4:1, 3:1, 2:1 or 1:1 mixture). The reaction is conveniently conducted between about 10 and 150° C., although some other temperature may be used, provided it does not cause decomposition of components of the reaction mixture, and is not above the boiling point of the solvent. The temperature may be between about 10 and 120, 10 and 100, 10 and 80, 10 and 50, 10 and 30, 20 and 150, 50 and 150, 100 and 150, 20 and 100, 20 and 80, 80 and 120, 20 and 50 or 50 and 80° C., e.g. about 10, 15, 20, 25, 30, 35, 40, 45, 50, 55, 60, 65, 70, 75, 80, 85, 90, 95, 100, 105, 110, 115, 120, 125, 130, 135, 140, 145 or 150° C. After the reaction is completed, the polyNHC metal complex may be separated from the reaction mixture e.g. by filtration or by some other suitable method.

The polyNHC metal complex may be recycled or reused for catalysing subsequent reactions. It may be reused 1, 2, 3, 4, 5, 6, 7, 8, 9, 10 or more than 10 times.

If the monomer units of the polymeric salt, or polymeric carbene, or polyNHC metal complex, of the invention are chiral, then they may be used to catalyse a chiral reaction, e.g. a chiral Suzuki synthesis or a chiral cyanation reaction. The enantiomeric excess of the product of such a chiral reaction may be greater than about 50%, or greater than about 60, 70, 80, 90 or 95%, for example about 50, 55, 60, 65, 70, 75, 80, 85, 90, 95, 96, 97, 98 or 99%.

The inventors have developed a novel type of heterogeneous NHC metal complexes, main chain poly-imidazolium and poly-NHC-metal complexes (see FIG. 1). In FIG. 1, P represents a polymer, so that 1 represents a polymer supported NHC metal complex. 2 represents a mesoporous silica-supported NHC metal complex. 3 represents a main chain poly-NHC-metal complex according to the present invention. The easily synthesized main chain poly-NHC-Pd catalysts have very high catalyst loading and are very stable and robust. A general and simple way to obtain excellent heterogeneous NHC-based catalysts has been demonstrated. These catalysts exhibit excellent activities for Suzuki coupling reactions involving activated, non-activated and de-activated bromoarene and iodoarene substrates. They also show activity towards chloroarene substrates.

Figure 2:
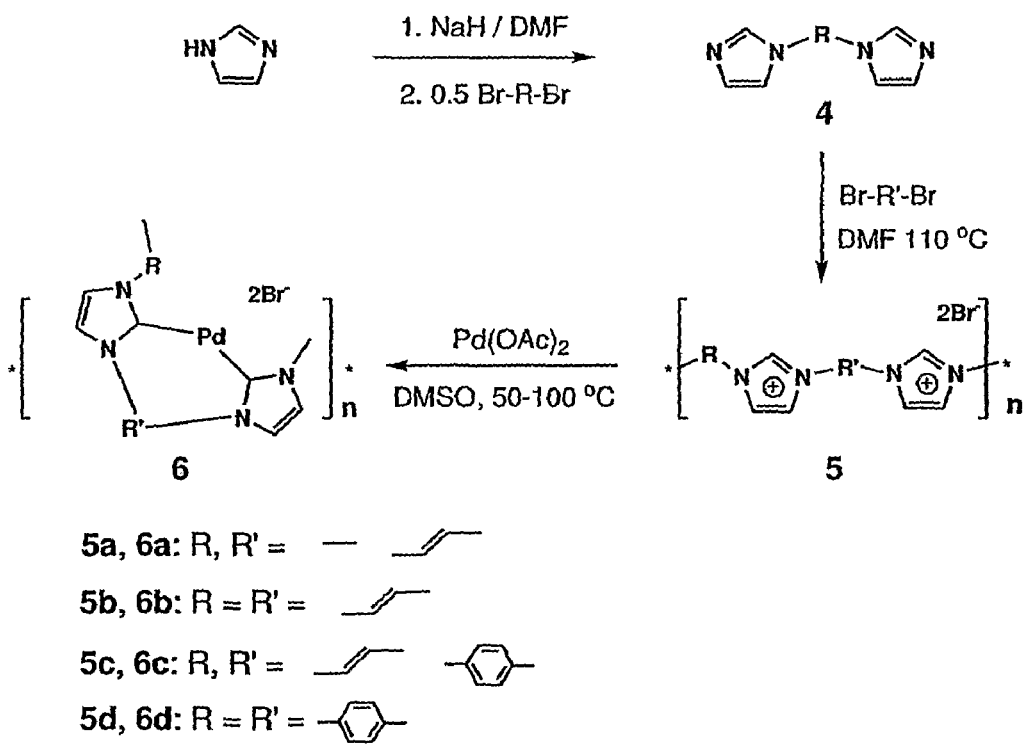
FIG. 2 shows a reaction scheme for synthesising the supported NHC metal complexes of the present invention.
Figure 3:
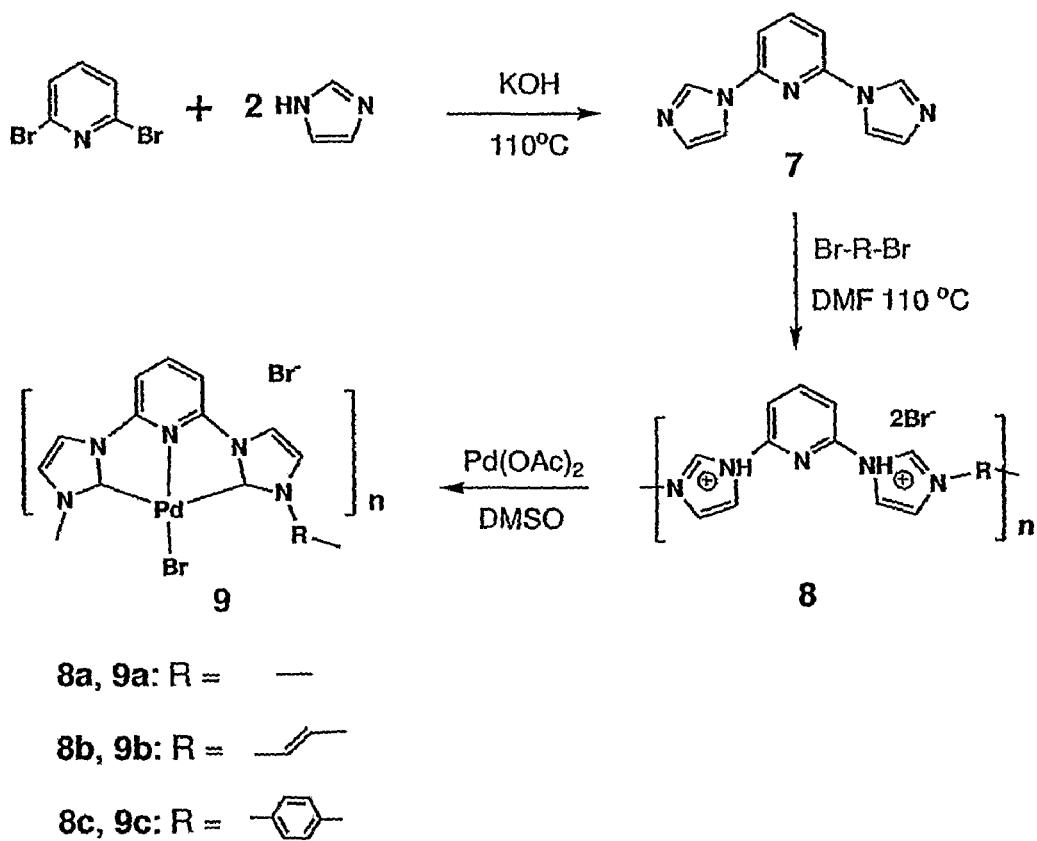
FIG. 3 shows a reaction scheme for synthesising the supported NHC metal complexes of the present invention in which the metal is triply coordinated.

Rigid benzene or butylene-based spacers may be used to ensure regiocontrol over alkylation and to inhibit formation of small-ring products (see FIG. 2). To synthesize poly-imidazolium bromide 5, two types of spacers were used. At least one of the spacers should be rigid, e.g. benzene ring. Imidazole (Im) was first alkylated by using dibromo-ended spacer (Br—R—Br) to form bi-imidazole (Im-R-Im), followed by a second-step alkylation with another dibromo-ended spacer (Br—R'—Br) in N,N-dimethylformamide (DMF) at 110° C. overnight to provide the poly-imidazolium bromides in high yields. The poly pincer (i.e. tridentate) type imidazolium bromides 8 (FIG. 3) were synthesized in the same manner, except that 2,6-dibromopyridine was used as the first spacer. Due to the very low solubility of the poly-imidazolium salts, it was difficult to determine their exact molecular weight. Polymers 5 and 8 were insoluble in normal solvents, but swelled in hot dimethyl sulfoxide (DMSO). Polymer 5 was soluble in DMSO upon heating. $^1$H nuclear magnetic resonance (NMR) of 5 in DMSO was in agreement with its polymeric structure, and the signals from the end groups were not readily distinguishable. Combining the NMR data with elemental analysis results, the number average of monomer units per polymer chain was estimated to be 10-20 in polymers 5 and 8.

Metal incorporation was carried out by a modified Hermann's and Crabtree's method (Herrmann, W. A.; Schwarz, J.; Gardiner, M. G. *Organometallics* 1999, 18, 4082; Loch, J. A.; Albrecht, M.; Peris, E.; Mata, J.; Faller, J. W.; Crabtree, R. H. *Organometallics* 2002, 21, 700) by treating poly-imidazolium bromides 5 and 8 with Pd(OAc)$_2$ in DMSO at room temperature, follow by heating from 50° C. to 150° C. The reaction suspensions were poured into dichloromethane and ether, which produced poly-NHC-Pd complexes 6 and 9. The palladium-incorporation reactions for poly-imidazolium bromides 5 were much faster, and could be finished at lower temperatures compared to that for poly-imidazolium 8. The latter reaction required heating at 150° C. for several hours. The poly-NHC-Pd complexes were insoluble in common solvents. Elemental analyses and photoacoustic Fourier-transform infrared (PA-FTIR) data suggested that palladium was incorporated into the poly-imidazolium bromide chains and formed complexes. PA-FTIR and solid state $^{13}$C NMR spectroscopies confirmed that palladium was coordinated specifically at the C2 position of the imidazolium. The strong band of quaternary imidazolium in 5a appeared at 1157 cm$^{-1}$ in the PA-FTIR spectrum. After palladium incorporation in 6a, this band disappeared, and the alkene band at 1665 cm$^{-1}$ became stronger. In the solid state $^{13}$C NMR spectrum, the C2 carbon signal of 8a was observed at 145 ppm. This peak was significantly reduced in intensity in the spectrum of 9a. It is known that supported NHC-Pd complexes were very stable in solvent (for example, supported monodentate NHC-Pd complex was stable to 150° C., and supported bidentate or pincer type complexes were even more stable). The melting points of catalysts 6 and 9 were determined to be 250-290° C. The palladium loadings in 6a (19.7 wt %), 6c (17.0 wt %), 9a (17.5 wt %) and 9b (16.6 wt %) were calculated based on elemental analyses and thermal gravimetric analyses (TGA).

Figure 4:
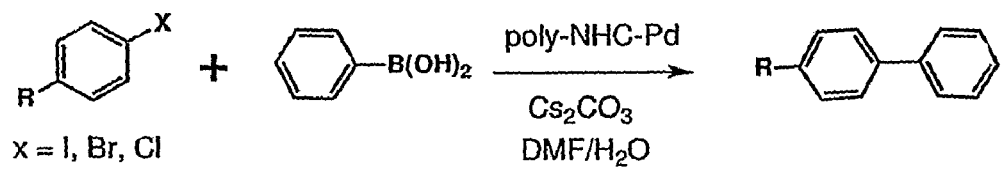
FIG. 4 shows a reaction scheme for a Suzuki reaction using a supported NHC metal complex according to the present invention.

Heterogeneous Suzuki Cross-Coupling Reaction. The catalytic activity of the poly-NHC-palladium catalysts 6 and 9 was investigated in the palladium-catalyzed Suzuki reaction (FIG. 4). Firstly, several solvents were examined for the reaction of bromobenzene and phenylboronic acid over the poly-NHC-Pd catalysts 6a and 9a (1 mol %). Biphenyl was achieved in excellent yields (90% and 99%, respectively) over catalyst 6a in dioxane/water (8:2) and DMF/water (8:2) (Table 1, entries 3 and 5). However, only a moderate yield (50%) was obtained in toluene/water (8:2) (Table 1, entry 4). This solvent effect indicated that the catalyst swelling was important to accelerate the reaction. Compared to catalyst 6a, catalyst 9a gave slightly lower yields with the same solvents.

The Suzuki cross-coupling reaction of various aryl iodides, bromides and chlorides with phenylboronic acid was examined over 6a. Table 2 shows that both non-activated and de-activated aryl iodides were converted to the corresponding biaryls with excellent yields at room temperature. The reaction of both the electron-deficient aryl bromides and electron-rich aryl bromides with phenylboronic acid proceeded smoothly to give biaryls with excellent yields within 4-6 h at 80° C. (Table 2, entries 6-13). This poly-NHC-Pd catalyst also showed very high activities in the reaction of N-containing aryl bromides, such as 4-bromopyridine and 2,6-dibromopyridine, with phenylboronic acid to produce 4-phenylpyridine and 2,6-diphenylpyridine, respectively, in excellent yields (Table 2, entries 14 and 15). The catalyst was so effective that all of the aryl iodides and bromides were converted to the corresponding products in excellent yields. Furthermore, it was found that the poly-NHC-Pd catalyst was also active in the reaction of aryl chlorides with phenylboronic acid to produce the corresponding biaryls in moderate to good yields under mild conditions. Generally, only those NHC-Pd complexes with very bulky side-groups would show high activities toward aryl chlorides in Suzuki reaction, and such high activities have only been demonstrated in homogeneous systems. In the present work, the high activity of poly-NHC-Pd catalysts towards aryl chlorides might be explained by the bidentate or pincer type coordination model, and also the main chain NHCs' polymer structure, which makes the catalytic active sites sterically crowded. This poly-NHC-Pd catalyst also demonstrated excellent reusability. It was reused 5 times in the reaction of iodoanisol or bromobenzene and phenylboronic acid under DMF/water for 4 h at 80° C. (Table 2, entries 3-8). It was remarkable that the poly-NHC-Pd catalyst maintained an excellent catalytic activity upon repeated recycling.

In conclusion, novel main chain poly-imidazolium salts and their corresponding is palladium complexes were successfully developed. As a heterogeneous catalyst, poly-NHC-Pd provided for ease of synthesis, high catalyst loading and robustness under different reaction conditions. Poly-NHC-Pd complexes showed excellent activities towards all kinds of bromoarene and iodoarene substrates, and moderate activities towards chloroarene substrates in heterogeneous Suzuki cross-coupling reactions. They were much more active than other supported NHC-Pd catalysts. The poly-NHC-Pd complexes also demonstrated excellent reusability. The catalyst activity of the poly-NHC-Pd complexes could be improved by modifying the catalyst structure. The poly-imidazolium salts could be incorporated with different metals to catalyze various reactions.

TABLE 1

Heterogeneous Suzuki cross-coupling reaction of bromobenzene and phenylboronic acid over 6a and 9a.

| Entry | Catalyst[a] | Solvent[b] | Temperature (° C.) | Time (h) | Yield[c] (%) |
|---|---|---|---|---|---|
| 1 | 9a | Dioxane | 80 | 4 | 88 |
| 2 | 9a | Toluene | 80 | 4 | 40 |
| 3 | 6a | Dioxane | 80 | 4 | 90 |
| 4 | 6a | Toluene | 80 | 4 | 50 |
| 5 | 6a | DMF | 80 | 4 | 99 |

[a]Typical reaction conditions: 1 mol % of catalyst, 1 mmol of Cs$_2$CO$_3$, 0.75 mmol of C$_6$H$_5$B(OH)$_2$, 0.5 mmol of substrate in solvent (0.8 ml) mixed with water (0.2 ml).
[b]H$_2$O (20 vol %) was used as co-solvent in all reactions.
[c]Yields were determined by using gas chromatography (GC) and gas chromatography-mass spectrometry (GC-MS).

TABLE 2
Heterogeneous Suzuki cross-coupling reactions or aryl iodides, bromides and chlorides and phenylboronic acid over 6a.[a]
| Entry | Substrate | Product | Temperature (° C.) | Time (h) | Yield[b] (%) |
|---|---|---|---|---|---|
| 1 | 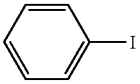 | 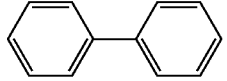 | 23 | 10 | 95 |
| 2 | 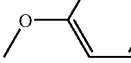 | 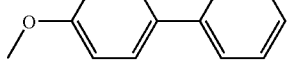 | 23 | 10 | 85 |
| 3 | 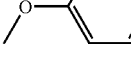 | 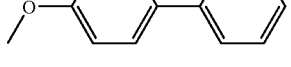 | 80 | 4 | 99 |
| 4[c] | 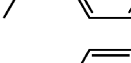 | 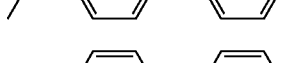 | 80 | 4 | 99 |
| 5[d] | 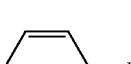 | 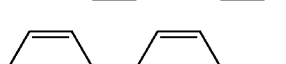 | 80 | 4 | 99 |
| 6 | 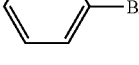 | 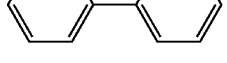 | 80 | 4 | 99 |
| 7[e] | 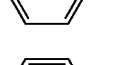 |  | 80 | 4 | 98 |
| 8[f] | 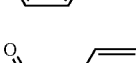 | 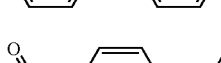 | 80 | 4 | 99 |
| 9 | 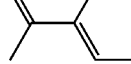 | 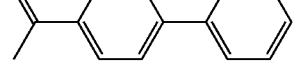 | 80 | 4 | 99 |
| 10 | 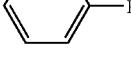 | 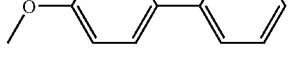 | 80 | 4 | 99 |
| 11 | 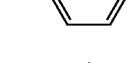 |  | 80 | 6 | 99 |
| 12 | 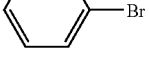 | 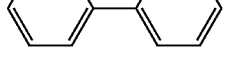 | 80 | 6 | 91 |
| 13 | 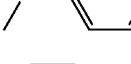 | 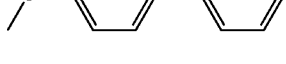 | 80 | 6 | 99 |
| 14 | 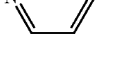 |  | 80 | 6 | 91 |

TABLE 2-continued

Heterogeneous Suzuki cross-coupling reactions or aryl iodides, bromides and chlorides and phenylboronic acid over 6a.[a]

| Entry | Substrate | Product | Temperature (° C.) | Time (h) | Yield[b] (%) |
|---|---|---|---|---|---|
| 15 | 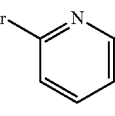 | 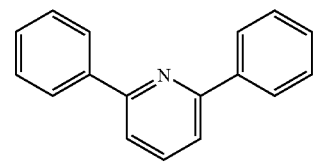 | 80 | 6 | 99 |
| 16 |  | 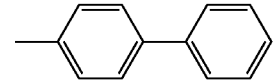 | 80 | 14 | 5 |
| 17 | 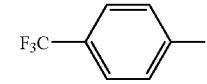 |  | 80 | 14 | 16 |
| 18 | 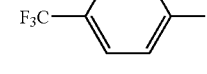 | 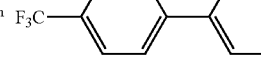 | 120 | 14 | 53 |
| 19 | 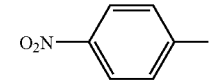 |  | 80 | 14 | 47 |

[a]Typical reaction conditions: 1 mol % of catalyst, 1 mmol of $Cs_2CO_3$, 0.75 mmol of $C_6H_5B(OH)_2$, 0.5 mmol of substrate in solvent (0.8 ml) mixed with water (0.2 ml).
[b]Yields were determined by using GC and GC-MS.
[c]Recycled catalyst of entry 3.
[d]Recycled catalyst after 4 runs.
[e]Recycled catalyst of entry 6.
[f]Recycled catalyst after 4 runs.
[g]Anisolboronic acid was used instead of benzeneboronic acid.
[h]$Bu_4NBr$ (10%) was added.

The inventors have also shown that versatile colloidal particles of main chain poly-imidazolium salts may be prepared by alkylation of imidazoles. These may be produced in the form of particles, with diameters adjustable from a few hundred nanometers to several micrometers. These may be spontaneously formed when certain spacer groups are used. The parent ionic polymer particles may be converted to poly-N-heterocyclic carbene particles and poly-organometallic particles. The ease with which these particles can be fabricated and the ability to tailor their chemical and physical properties renders them suitable for a wide range of practical applications. The inventors have shown that such particles may be used in organo-catalysis and organometallic catalysis.

Figure 5:
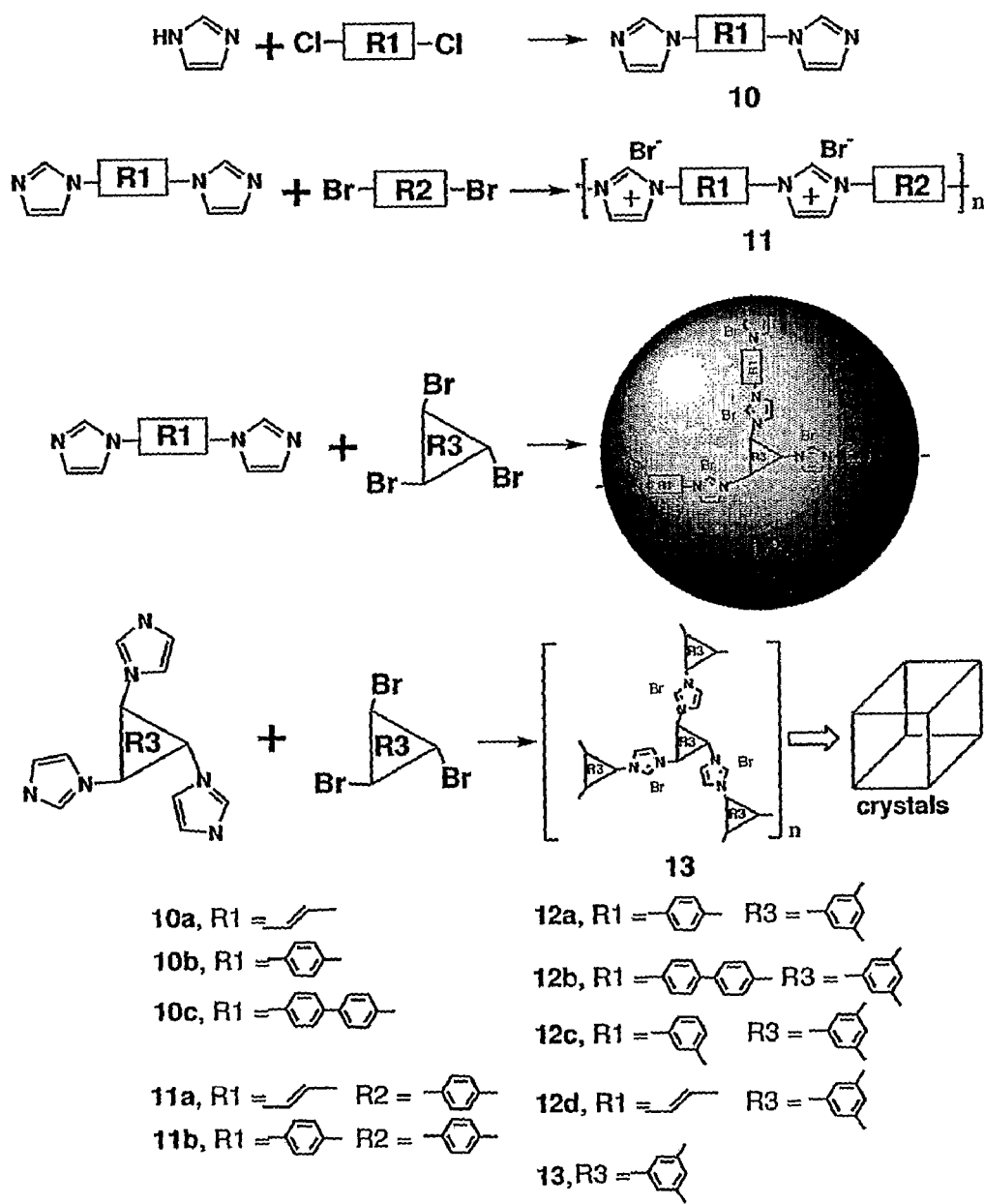
FIG. 5 shows reaction schemes for synthesising poly-imidazolium salts of different polymer architecture.
Figure 6:
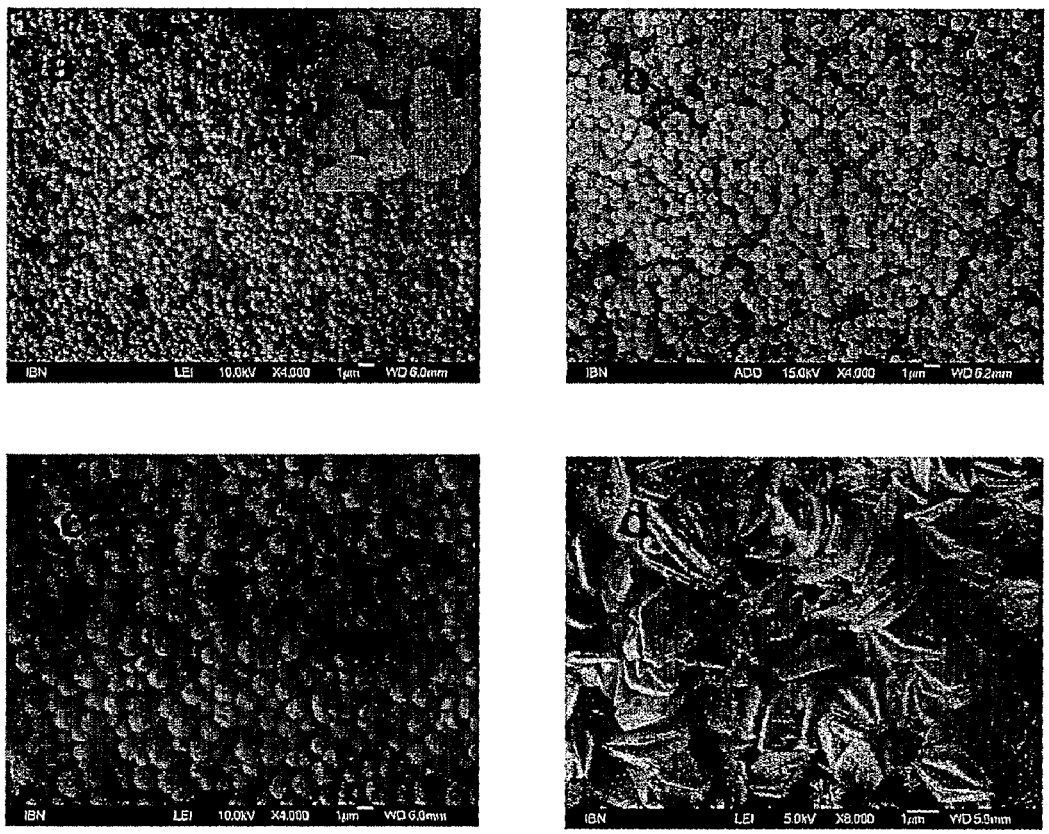
FIG. 6 shows scanning electron micrographs of particles of supported NHC metal complexes according to the present invention: a) surface modified spherical particles 12a* (made as described in FIG. 7), b) spherical particles 12a (made as described in FIG. 7), c) spherical particles 12a (made as described in FIG. 7) prepared in THF, d) microcrystal particles 13 (made as described in FIG. 5)

The inventors have designed a two steps alkylation process for making poly-imidazolium halogen salts (FIG. 5), Rigid spacers were used to ensure regiocontrol over alkylation and to inhibit formation of small-ring products. It was discovered that the microstructure of the polymer products is strongly dependent on the structure of the monomers. When two bidentate monomers were condensed, linear polymers with an amorphous microstructure were produced. When a combination of one bidentate and one tridentate monomers was used, uniform spherical micro- and nanoparticles composed of poly-imidazolium networks were formed by imidazole alkylation reaction induced assembly of different building-units (FIGS. 5 and 6). Furthermore, use of two tridentate monomers generated micro-crystalline particles (FIG. 6). The surface modified spherical particles 12a* shown in FIG. 6a have an average diameter of 0.413±0.130 µm (see FIG. 3 for preparation). The spherical particles 12a shown in FIG. 6b have an average diameter of 0.755±0.140 µm made in DMF. The spherical particles 12a shown in FIG. 6c was prepared in THF at 80° C., they have an average diameter of 1.450±0.470 µm. The microcrystal particles 13 shown in FIG. 6d are well crystallized with an average size 2.5~3.5 µm. In a typical experiment for preparation of spherical particle products, a bis-imidazole precursor 10 and 2,4,6-tris(bromomethyl) mesitylene (in 3:2 mol ration) were dissolved in DMF in a pressure flask. The flask was sealed and heated to 50 to 110° C., resulting in the spontaneously formation of spherical polymer particles 3 in 30 mins to 10 hrs. The size of the particles was found to depend on the temperature, concentration and the polarity of solvents. The resulting poly-imidazolium salt particles were insoluble in common solvents.

An important factor for assembly of spherical particles in the present invention is the use of a combination of bidentate and tridentate monomers. It is theorised that nucleation of the particles occurs through formation of a dendrimer type structure. The particles may then be formed through alkylation reactions on the dendrimer structure. The size of the particles may be controlled by changing solvent, spacer group and the monomer concentration. For example, when THF was used as solvent instead of DMF for synthesis of 12a under conditions under which in DMF would produce particles of about 900 nm diameter, smaller spherical nano-particles (about 400 nm diameter) were formed. This may be due to the much lower solubility of the product in THF, which may result in more rapid nucleation and particle precipitation. When biphenyl was used instead of phenyl as a spacer group, smaller particles of 12b (about 700 nm) precipitated (compared to 900 nm for 12a). It was also observed that more concentrated solution result in larger particle sizes (FIG. 6).

Scanning electron microscopy (SEM, FIG. 6) images of samples show spherical particles with different size. The average particle size of the samples varied from about 500 nm to about 1500 nm. Elemental analyses and photoacoustic Fourier-transform infrared (PA-FTIR) results were in agreement with their chemical composition. A strong band attributable to quaternary imidazolium in the polymer particles appeared at 1157 cm$^{-1}$ in the PA-FTIR spectra. Solid state $^{13}$C NMR spectroscopy also confirmed the poly-imidazolium salt compositions. The signal due to C2 carbon was observed at around 145 ppm. Thermal analyses showed that the polymer particles are stable up to about 300° C. and decomposed at about 320 to 350° C. Powder X-ray diffraction data for these spherical particles 12 show that they are amorphous and not crystalline materials.

Figure 7:
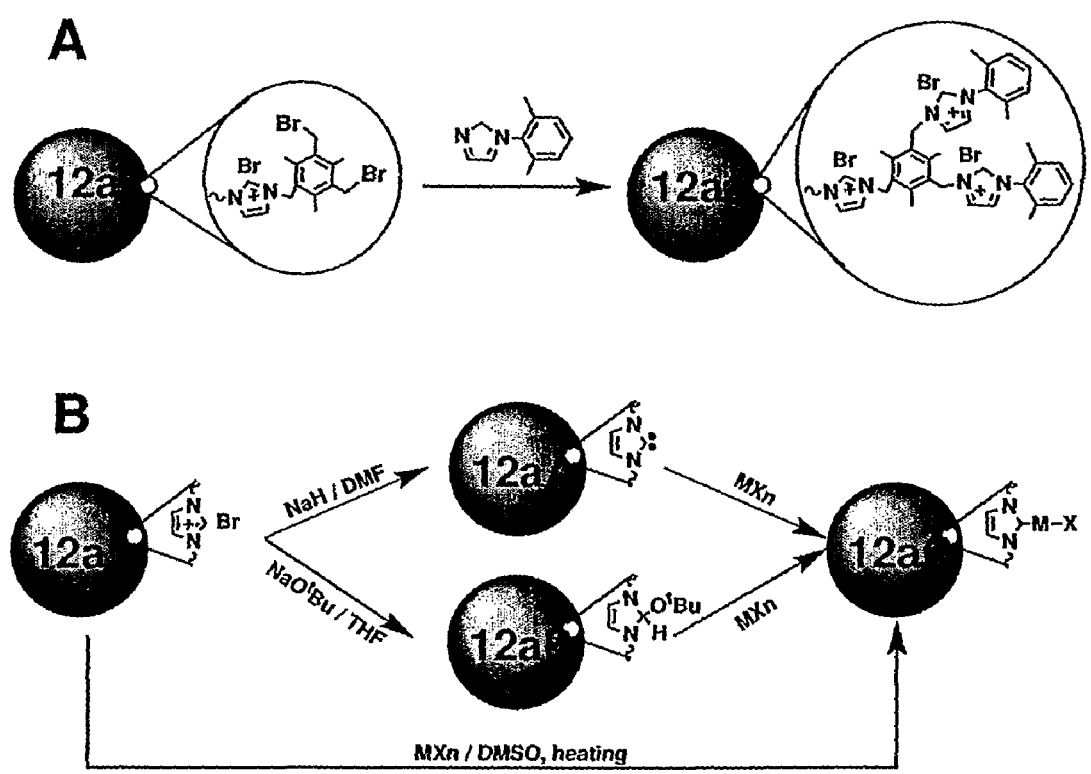
FIG. 7 shows a reaction scheme illustrating addition of endgroups to the supported NHC metal complexes of the present invention.

The inventors found, surprisingly, that it is possible to tailor the chemical and physical properties of the poly-imidazolium particles for different applications. A two stage modification process was used for the polymer particles. In the first stage, poly-imidazolium particles were modified by modifying the spacer group (FIG. 5) and by adding an end-group in order to modify their surface properties (FIG. 7). As the spacer group R is changed, the steric environment of the active site, and the density and micro-porosity of the particles change. The end group makes the surface of particles more compatible with common solvents. In the second stage, the ionic polymer particles are converted into neutral free carbene polymer and organometallic polymer. The experimental protocol of these processes is shown in FIG. 7. These transformations modify the chemical and physical properties of the initial polymer particles and make them suitable for a wide range of applications, for example in catalysis. Thus in step A of FIG. 7, the particles are surface modified by adding an endgroup to the bromine containing particles 12a. Suitable endgroups include aryl groups such as 2,6-dimethylphenyl groups other aryl groups (e.g. optionally substituted, phenyl, naphthyl etc), alkyl groups (e.g. optionally substituted C1 to C20 straight chain or C3 to C20 branched or cyclic), alkenyl groups, alkynyl groups etc. In step B, ionic particles 12a are converted into free carbene containing particles 12aA, protected carbene containing to particles 12aB and organometallic particles 12aC. SEM images show that the particles produced by this two stage process (12aA, 12aB, 12aC) retain the same spherical morphology as the particles from which they were produced (see FIG. 6 for example). Transition electron microscopy images (TEM, FIG. 8) show that no metal nano-particles were observed in the particles of 12aC. This suggests that metal ions are coordinated with carbene to form the metal-carbon bonds. This model is also in agreement with the IR and solid state $^{13}$C NMR results.

N-Heterocyclic carbenes (NHCs) have been used to catalyze numbers of important organic transformations. Particles 12aA and 12aB may also be useful in heterogeneous catalyzed cyanation reaction between TMSCN and carbonyl compounds and other heterogeneously catalysed reactions. In addition, the polymeric salts of the present invention may also catalyse the cyanation reaction. Thus particles 12a may also be used as a heterogeneous catalyst. The scheme below shows a cyanation reaction which may be catalysed by these particles.

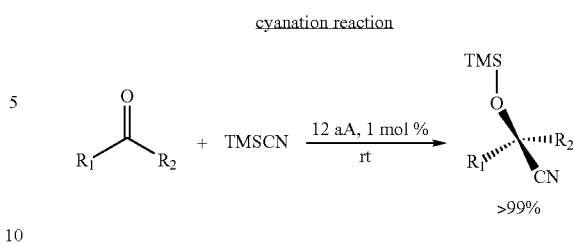

cyanation reaction

Both 12aA or 12aB may be generated in situ or may be isolated. These particles showed very high catalytic activities under very mild conditions to the cyanation reaction. The reactions went to near completion in about 10 minutes to about 2 hours at room temperature to give excellent yields for a wide range of aldehyde and ketone substrates with 0.1-1 mol % of catalysts loading. The catalyst particles show excellent recycle stabilities. SEM images showed that the catalyst particles retained spherical morphology after the reaction cycle. This demonstrates that the main chain poly-imidazolium salts particles were successfully converted to poly-NHCs particles and applied in heterogeneous recyclable organosynthetic catalysis.

The catalysis applications of organometallic particles 12aC were also investigated. It was demonstrated that particle 12aC-Pd represented the most active heterogeneous NHC-Pd catalyst for Suzuki coupling reaction of those particles tested. With 1 mol % of catalyst 12aC-Pd particle, both non-activated and de-activated aryl iodides were converted to the corresponding biaryls with excellent yields at room temperature. The reaction of both the electron-deficient aryl bromides and electron-rich aryl bromides with phenylboronic acid also proceeded smoothly to produce biaryls with excellent yields within about 4 to 6 h at about 80° C. Furthermore, it was found that the particle catalyst 12aC-Pd was also active in the reaction of aryl chlorides with phenylboronic acid to produce the corresponding biaryls in excellent yield at 100° C. It was found that in this reaction, particle catalyst 12aC-Pd was much more active than amorphous poly-NHC-Pd derived from 11. 12aC-Pd catalyst also demonstrated excellent reusability as a heterogeneous catalyst. Generally, only those NHC—Pd complexes with very bulky side-groups have shown high activities toward aryl chlorides in Suzuki reaction. The high activity of 12aC-Pd particles may due to the polymeric structure of the main chain NHC, which makes the catalytic active sites sterically crowded.

The inventors have demonstrated the synthesis and use of micron-sized and nanometer-sized poly-imizdazolium spherical particles. They can be easily converted to poly-NHCs and poly-NHC-metal particles in order to tailor their chemical and physical properties. These colloidal particles provide a useful platform for playing versatile chemistry of NHCs. As the imidazole building units may be easily converted to chiral blocks, such as 4,5-diphenyl-imidazolidine, these materials may be used in asymmetric catalysis and separations. The 3D network structure of the these particles results in amplifying local structure characters (such as chirality) to the whole particle and the small size of the particles results in a high surface area and provides benefits compared to non-particulate products.

EXAMPLE

General Information. All solvents and chemicals were used as obtained from commercial suppliers, unless otherwise indicated. Centrifugation was performed on Eppendorf Centrifuge 5810R (4000 rpm, 10 min). $^1$H and $^{13}$C NMR spectra were recorded on Bruker AV-400 (400 MHz) instrument. Data for $^1$H and $^{13}$C NMR were reported as chemical shift (δ ppm), multiplicity (s=singlet, d=doublet, t=triplet, q=quartet, m=multiplet). PA-FTIR spectra were recorded on Digilab FTS 7000 FTIR spectrometer equipped with a MTEC-300 photoacoustic detector. GC-MS was performed on Shimadzu GCMS QP2010. GLC was performed on Agilent 6890N Series gas chromatographs equipped with split-mode capillary injection system and flame ionization detector. Elemental analysis (C, H, N) was performed on EAI CE-440 Elemental Analyzer. Melting point measurement was performed on OptiMelt Automated Melting Point System. Thermal gravimetric analysis (TGA) was performed on Perkin-Elmer Pyris-1 Thermogravimetric Analyzer.

Progress of the Suzuki reactions was typically monitored by GC or GC-MS analysis of reaction aliquots.

Poly-Imidazolium Bromide 5a. NaH (60% in oil, 400 mg, 10 mmol) was added to a DMF solution of imidazol (680 mg, 10 mmol), and the resulting suspension was stirred at room temperature for 5 h. 1,2-dibromoethane (940 mg, 5 mmol) was added to the residue. The resulting solution was stirred at room temperature for another 4 h. The solvent was removed under vacuum. 1,2-diimidazolethane was extracted with dichloromethane. To the DMF solution of this product, 1,4-dibromobutylene (1.07 g, 5 mmol) was added. The resulting solution was stirred at 110° C. for 16 h. A pale brown solid product was precipitated in the reaction flask, and it was filtered, washed with DMF and CH$_2$Cl$_2$, and dried under vacuum. 5a was obtained in 82% yield (1.54 g) as a solid. $^1$H NMR (DMSO-d6): δ 9.50 (s, 1H), 7.80 (s, 1H), 7.70 (s, 1H), 6.15 (s, 1H), 4.90 (s, 2H), 4.75 (s, 2H).

Poly-Imidazolium Bromide (8a). 1,2-dibromoethane (1.88 g, 10 mmol) was added to a DMF solution of 2,6-diimidazolpyridine (2.11 g, 10 mmol). The resulting solution was stirred at 110° C. for 16 h. A white solid product was precipitated in the reaction flask, and it was filtered, washed with DMF and CH$_2$Cl$_2$, and dried under vacuum. 8a was obtained in 85% yield (3.39 g) as a white solid. Elemental analysis: calc. for [C$_{13}$H$_{13}$N$_5$Br$_2$]$_n$ (n=10) (8a): C 37.71, H 3.19, N 16.66; obs.: C 37.81, H 3.65, N 16.48.

Poly-NHC-Pd (6a). Pd(OAc)$_2$ (448 mg, 2 mmol) was added to a DMSO suspension of poly-imidazolium bromide (5a) (752 mg). The resulting mixture was stirred at room temperature for 2 h, 50° C. for 10 h, and 120° C. for 2 h. The reaction mixture was poured into 30 ml of CH$_2$Cl$_2$, and then 100 ml of ether was added. The grayish-green solid obtained was filtered, washed with DMF and CH$_2$Cl$_2$, and dried under vacuum. 6a was obtained in 92% yield, based on 5a (886 mg). Elemental analysis: calc. for [C$_{12}$H$_{14}$N$_4$Br$_2$Pd]$_n$ (n=10) (6a): C 29.35, H 2.89, N 11.22, Pd 21.33; obs. C 28.23, H 2.93, N 10.16, Pd 19.7. M.P.: 277.9° C.

Poly-NHC-Pd (9a). 9a was synthesized with the same procedure as 6a, except the reaction mixture was stirred at 150° C. for 2 h at the last stage. 9a was obtained as a dark green solid in 92% yield, based on 8a. Elemental analysis: calc. for [C$_{13}$H$_{11}$Br$_2$N$_5$Pd]$_n$ (n=10) (9a): C 30.33, H 2.87, N 13.40, Pd 20.30; obs. C 29.69, H 3.01, N 12.76, Pd 17.5. M.P.: 244.2° C.

Experimental Procedure for Suzuki Coupling. Aryl halide (0.5 mol), phenylboronic acid (0.75 mmol), cesium carbonate (1.0 mmol), mesitylene (0.5 mmol) (internal standard for GC analysis) and palladium catalyst (1%) (i.e. a polyNHC palladium complex according to the present invention) were mixed in a vial. 1.5 ml of solvent (DMF/H$_2$O=1:0.2) was added to this reaction mixture. The vial was capped and the reaction mixture was stirred at the desired temperature under ambient atmosphere. After completion of the reaction (as determined by GC-MS), the catalyst was filtered and the reaction mixture was poured into water. The aqueous phase was extracted with CH$_2$Cl$_2$. The product was confirmed by GC-MS and the yield was determined by GC. The reaction mixture was centrifuged, and the solution was decanted. This procedure was repeated at least three times using methanol as the washing solvent. The recovered catalyst was used directly for the next run.

The invention claimed is:

1. A polymeric salt, wherein a monomer unit of the polymeric salt comprises two nitrogen containing heterocyclic groups joined by a linker group such that nitrogen atoms of the heterocyclic groups are disposed so as to enable a polymeric carbene formed from the polymeric salt to complex with a metal atom, said polymeric salt comprising a monomer unit of structure (I),

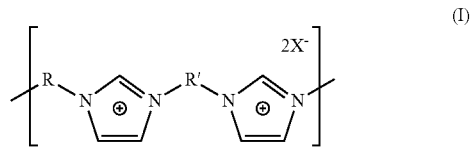

wherein the rings are optionally substituted at C4 and/or C5, R and R' are different linker groups in which R' is a rigid linker group, X$^{31}$ is a counterion, and the degree of polymerization is such that the salt is substantially insoluble in solvents used in the Suzuki reaction, and wherein ═ represents either a single bond or a double bond.

2. The polymeric salt of claim 1 wherein the monomer unit of structure (I) is in the main polymer chain.

3. The polymeric salt of claim 1 wherein R' is selected from the group consisting of optionally substituted ethenyl, ethynyl, aryl, heteroaryl and cycloalkyl linker groups.

4. The polymeric salt of claim 1 wherein at least one of the linker groups comprises a heteroatom disposed so that, if a metal atom is complexed to or bonded to the rings which are linked by said linker group, said heteroatom is also capable of complexing or bonding to the metal atom.

5. The polymeric salt of claim 1 wherein R is —(CH$_2$)$_2$—, trans —CH═CH—, 2,6-pyridylene or 1,4-phenylene, R' is trans —CH═CH—, 2,6-pyridylene or 1,4-phenylene and X is bromide.

6. The polymeric salt of claim 1 which is a copolymer salt comprising a first monomer unit and a second monomer unit, wherein the first and second monomer units each comprises two nitrogen containing heterocyclic groups joined by a linker group such that nitrogen atoms of the heterocyclic groups are disposed so as to enable a polymeric carbene formed from the polymeric salt to complex with a metal atom wherein:

the first and the second monomer units are both bidentate; or one of the first and second monomer units is bidentate and the other is tridentate or multidentate; or both the first and second monomer units are tridentate or multidentate.

7. The, polymeric salt of claim 6 wherein the first and second monomer units have structure (I).

8. The polymeric salt of claim 1 which is in the form of particles.

9. The polymeric salt of claim 8 wherein said particles are amorphous, spherical or microcrystalline.

10. The polymeric salt of claim 1, wherein at least one unit of said salt comprises structure (11), structure (12), or structure (13) and is selected from the group consisting of compound 11a, 11b, 12a, 12b, 12c, 12d and 13 defined below:

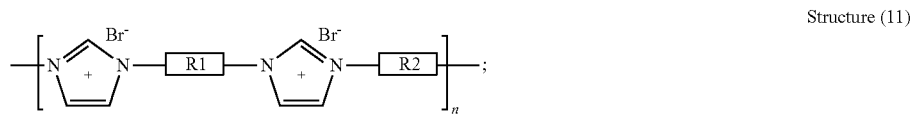

Structure (11)

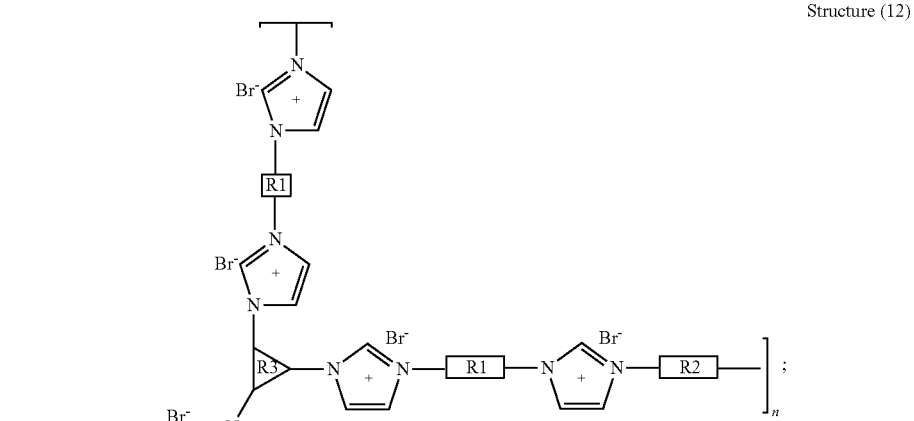

Structure (12)

Structure (13)

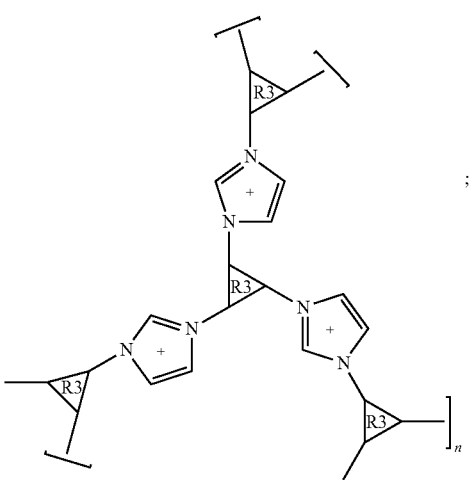

wherein compound 11a has structure (11),

R1 = ⁓CH=CH−⁓, and R2 = ⁓–C₆H₄–⁓;

R1 = ⁓–C₆H₄–⁓, and R2 = ⁓–C₆H₄–⁓;

wherein compound 11b has structure (11), wherein compound 12a has structure (12),

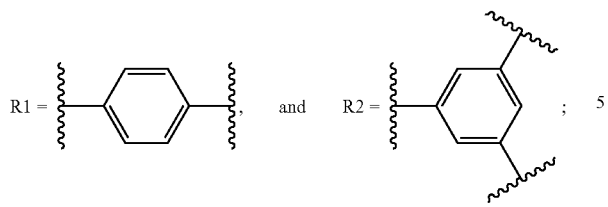 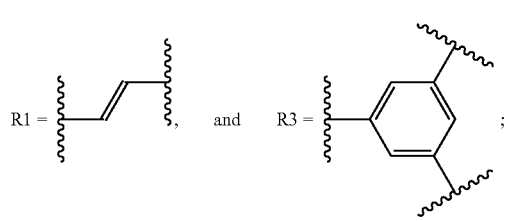
wherein compound 12b has structure (12),
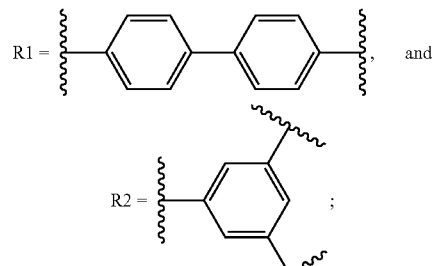
and wherein compound 13 has structure (13) and
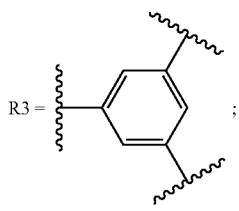
wherein compound 12c has structure (12),
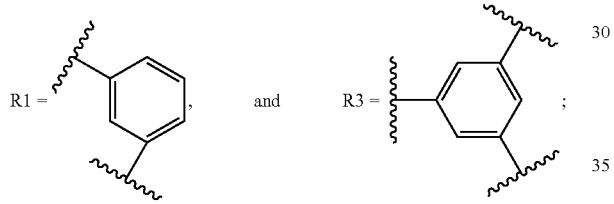
wherein n is a degree of polymerisation of said polymeric salt.
wherein compound 12d has structure (12),
* * * * *